United States Patent
Lee

(10) Patent No.: US 11,675,355 B2
(45) Date of Patent: Jun. 13, 2023

(54) PATH PROVIDING DEVICE AND PATH PROVIDING METHOD THEREOF

(71) Applicant: LG Electronics Inc., Seoul (KR)

(72) Inventor: Jinsang Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 650 days.

(21) Appl. No.: 16/743,477

(22) Filed: Jan. 15, 2020

(65) Prior Publication Data
US 2020/0225666 A1    Jul. 16, 2020

(30) Foreign Application Priority Data
Jan. 15, 2019  (WO) ................ PCT/KR2019/000598

(51) Int. Cl.
*G05D 1/02*     (2020.01)
*G01C 21/36*    (2006.01)

(52) U.S. Cl.
CPC ......... *G05D 1/0212* (2013.01); *G01C 21/367* (2013.01); *G05D 2201/0213* (2013.01)

(58) Field of Classification Search
CPC ......... G05D 1/0212; G05D 2201/0213; G05D 1/0274; G01C 21/367; G01C 21/32
See application file for complete search history.

(56) References Cited

U.S. PATENT DOCUMENTS

| | | | | | |
|---|---|---|---|---|---|
| 2013/0117322 | A1* | 5/2013 | Fischer | ............. | G01C 21/3881 707/792 |
| 2013/0325317 | A1* | 12/2013 | Pylappan | ........... | G01C 21/3667 701/409 |
| 2013/0328937 | A1* | 12/2013 | Pirwani | ................ | G09G 5/373 345/660 |
| 2013/0332476 | A1* | 12/2013 | Sinha | ..................... | G06F 16/29 707/756 |
| 2014/0104197 | A1* | 4/2014 | Khosravy | ............ | G06F 3/0488 345/173 |
| 2014/0344296 | A1* | 11/2014 | Chawathe | ........... | G06F 16/9537 707/769 |
| 2015/0187097 | A1* | 7/2015 | Savvopoulos | ......... | G06T 11/20 345/441 |
| 2015/0262398 | A1* | 9/2015 | Iskander | ................. | G09G 5/14 345/420 |

(Continued)

FOREIGN PATENT DOCUMENTS

| | | |
|---|---|---|
| JP | 2016194814 | 11/2016 |
| KR | 20140100987 | 8/2014 |
| KR | 20180058608 | 6/2018 |

*Primary Examiner* — Rami Khatib
*Assistant Examiner* — Gabriel Joseph Rene Lambert
(74) *Attorney, Agent, or Firm* — Fish & Richardson P.C.

(57) ABSTRACT

A method of controlling a path providing device for providing a path to a vehicle, where the method includes: receiving, through a telecommunication control unit, high-definition map data from an external device, wherein the high-definition map data is received as a plurality of tile units; varying at least one of a size or a shape of at least one tile unit of the high-definition map data; generating, based on the high-definition map comprising the plurality of tile units, forward path information for guiding a path on a road ahead of the vehicle, wherein the forward path information is generated in units of lanes of the road ahead of the vehicle; and providing the forward path information to at least one electrical part provided in the vehicle.

18 Claims, 18 Drawing Sheets

(56) References Cited

U.S. PATENT DOCUMENTS

| | | | |
|---|---|---|---|
| 2015/0356118 A1* | 12/2015 | Kalai | G01C 21/34 |
| | | | 345/520 |
| 2016/0223355 A1 | 8/2016 | Habib et al. | |
| 2018/0017396 A1* | 1/2018 | Lynch | G01C 21/32 |
| 2018/0237018 A1* | 8/2018 | Goto | G05D 1/0088 |
| 2019/0266179 A1* | 8/2019 | Wheeler | G01C 21/00 |
| 2020/0003901 A1* | 1/2020 | Shroff | G01S 17/931 |
| 2020/0208995 A1* | 7/2020 | Hou | G01C 21/3881 |
| 2020/0409389 A1* | 12/2020 | Julian | G05D 1/0246 |

* cited by examiner

FIG. 1
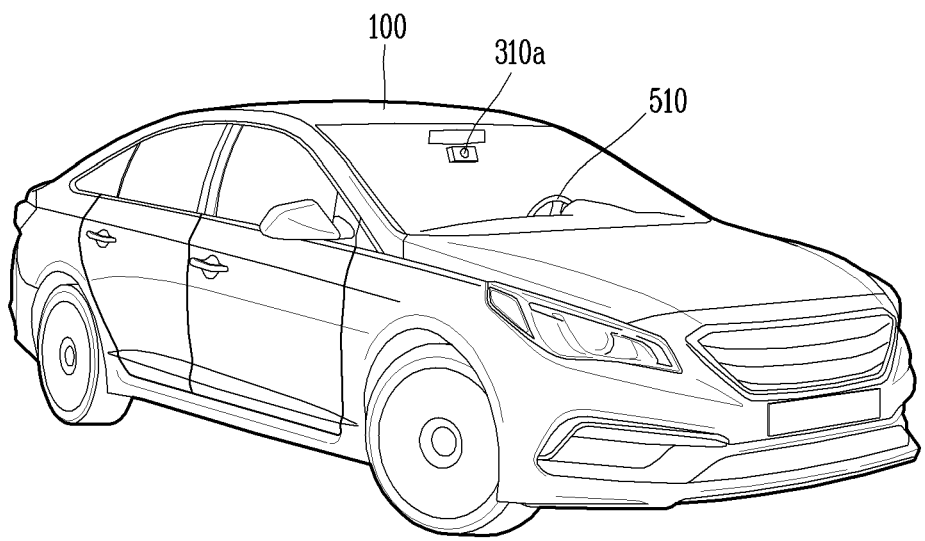
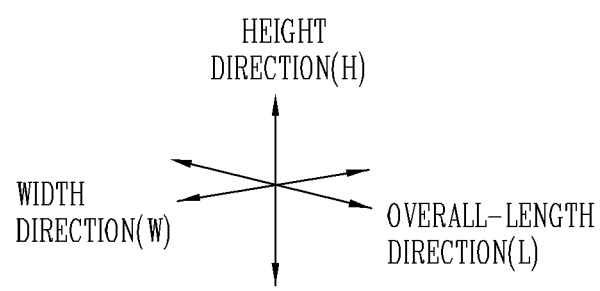

[ V2X-LDM ]

[ eHorizon-ADASIS ]

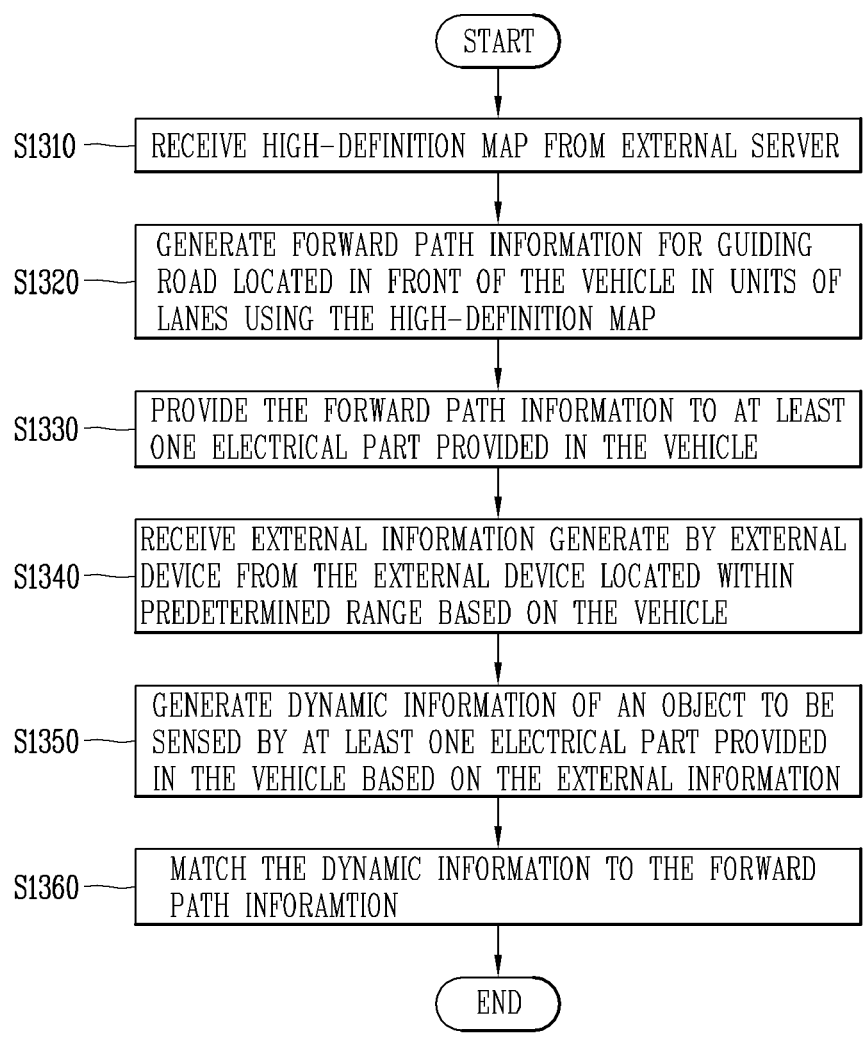

PATH PROVIDING DEVICE AND PATH PROVIDING METHOD THEREOF

CROSS-REFERENCE TO RELATED APPLICATIONS

Pursuant to 35 U.S.C. § 119(a), this application claims the benefit of an earlier filing date and right of priority to International Application No. PCT/KR2019/000598, filed on Jan. 15, 2019, the contents of which is incorporated by reference herein in its entirety.

TECHNICAL FIELD

The present disclosure generally relates to providing a path for a vehicle.

BACKGROUND

A vehicle is mechanism for transporting people or goods using kinetic energy. Representative examples of vehicles include automobiles and motorcycles.

For safety and convenience of a user who uses the vehicle, various sensors and devices are provided in the vehicle, and the functions of the vehicle are diversified.

The function of the vehicle may be divided into a convenience function for promoting the convenience of a driver and a safety function for promoting the safety of a driver and/or a pedestrian.

First, the convenience function has a motive for development related to driver convenience, such as giving an infotainment (information+entertainment) function to the vehicle, supporting a partial autonomous driving function, or assisting the driver's vision such as night vision or blind spot. For example, the convenience function may include an active cruise control (ACC) function, a smart parking assist system (SPAS) function, a night vision (NV) function, a head up display (HUD) function, an around view monitor (AVM) function, and an adaptive headlight system (AHS) function, and the like.

The safety function is a technology for securing the safety of the driver and/or the safety of a pedestrian, and may include a lane departure warning system (LDWS) function, a lane keeping assist system (LKAS) function, an autonomous emergency braking (AEB) function, and the like.

For convenience of a user using a vehicle, various types of sensors and electronic devices are provided in the vehicle. In particular, for the convenience of the user's driving, research on an advanced driver assistance system (ADAS) is being actively carried out. Furthermore, development of an autonomous vehicle is being actively carried out.

In recent years, as the development of an advanced driving assist system (ADAS) is actively undergoing, development of a technology for optimizing user's convenience and safety while driving a vehicle is required.

As part of this effort, in order to effectively transmit eHorizon (electronic Horizon) data to autonomous driving systems and infotainment systems, the EU OEM (European Union Original Equipment Manufacturing) Association has established a data specification and transmission method as a technical standard under the name "ADASIS (ADAS (Advanced Driver Assist System) Interface Specification)."

In addition, eHorizon (software) has become an essential element of the safety/ECO/convenience of autonomous vehicles under a connected environment.

SUMMARY

According to one general aspect, a path providing device is configured to provide a path to a vehicle, the path providing device including: a telecommunication control unit. The path providing device also includes at least one processor; and at least one computer memory operably connectable to the at least one processor and storing instructions that, when executed by the at least one processor, perform operations including: receiving, through the telecommunication control unit, high-definition map data from an external device, where the high-definition map data is received as a plurality of tile units. The operations also include varying at least one of a size or a shape of at least one tile unit of the high-definition map data. The operations also include generating, based on the high-definition map data including the plurality of tile units, forward path information for guiding a path on a road ahead of the vehicle, where the forward path information is generated in units of lanes of the road ahead of the vehicle. The operations also include providing the forward path information to at least one electrical part provided in the vehicle. Other embodiments of this aspect include corresponding computer systems, apparatus, and computer programs recorded on one or more computer storage devices, each configured to perform the actions of the methods.

Implementations may include one or more of the following features. The path providing device where varying the at least one of the size or the shape of the at least one tile unit of the high-definition map data is performed based on an expected driving path of the vehicle. The path providing device where generating the forward path information includes: based on a destination being set for the vehicle, determining the expected driving path of the vehicle as a first path to the destination; and based on the destination not being set for the vehicle, determining the expected driving path of the vehicle as a second path which has a highest possibility along which the vehicle is driven, based on a location of the vehicle. The path providing device where the operations further include: receiving, through the telecommunication control unit, at least one of a plurality of sub-tile units constituting a first main tile unit among the plurality of tile units, and based on the expected driving path. The path providing device where the first main tile unit includes a first group of sub-tile units and a second group of sub-tile units according to the expected driving path, where the first group of sub-tile units are received but the second group of sub-tile units are not received. The path providing device, where the operations further include: varying at least one of a size or a shape of at least one sub-tile unit among the plurality of sub-tile units constituting the first main tile unit, according to a road that is included in the first main tile unit. The path providing device where the operations further include: requesting, to the external device, a plurality of main tile units based on the expected driving path; and based on failure of reception of at least one main tile unit of the plurality of main tile units, requesting, to the external device, sub-tile units constituting the at least one main tile unit for which reception failed. The path providing device where the telecommunication control unit includes a first telecommunication control unit and a second telecommunication control unit, and where the operations further include: receiving, through the first telecommunication control unit, the high-definition map data from an external server; receiving, through the second telecommunication control unit, external information from an external communication device that is located within a predetermined range with respect to the vehicle; and based on the failure of reception of the at least one main tile unit: requesting the sub-tile units of the at least one main tile unit to the external server through the first telecommunication control unit. The path providing device where the at least one computer memory is further configured to store first tile units of the high-definition map data received through the telecommunication control unit, and where the operations further include: controlling the telecommunication control unit to not receive the first tile units that have been stored in the at least one computer memory, but to receive second tile units that are not stored in the at least one computer memory, based on the expected driving path. The path providing device where the operations further include: transmitting an update request message to the external device through the telecommunication control unit based on an updating to be performed on at least one of the first tile units that are stored in the at least one computer memory; classifying a plurality of sub-tile units constituting the at least one of the first tile units for which updating is to be performed, into (i) a first group of sub-tile units requiring updating, and (ii) a second group of sub-tiles requiring no updating; and receiving at least one of the first group of sub-tile units to perform the updating of the at least one of the first tile units that are stored in the at least one computer memory. The path providing device where the operations further include: measuring a quality of communication service of the telecommunication control unit; and varying the at least one of the size or the shape of the at least one tile unit based on the quality of communication service. The path providing device where the operations further include: receiving, through the telecommunication control unit, vehicle driving information from at least one electrical part provided in the vehicle; and determining at least one of the size or the shape of the at least one tile unit based on the vehicle driving information. The path providing device where varying the at least one of the size or the shape of the at least one tile unit is performed based on speed information of the vehicle that is included in the vehicle driving information. The path providing device where varying the at least one of the size or the shape of the at least one tile unit is performed based on a user input. The path providing device where the operations further include: transmitting, through the telecommunication control unit, a notification message informing the plurality of tile units to the external device. Implementations of the described techniques may include hardware, a method or process, or computer software on a computer-accessible medium.

Another general aspect of the present disclosure includes a method of controlling a path providing device for providing a path to a vehicle, the method including: receiving, through a telecommunication control unit, high-definition map data from an external device, where the high-definition map data is received as a plurality of tile units. The method also includes varying at least one of a size or a shape of at least one tile unit of the high-definition map data. The method also includes generating, based on the high-definition map data including the plurality of tile units, forward path information for guiding a path on a road ahead of the vehicle, where the forward path information is generated in units of lanes of the road ahead of the vehicle. The method also includes providing the forward path information to at least one electrical part provided in the vehicle. Other embodiments of this aspect include corresponding computer systems, apparatus, and computer programs recorded on one or more computer storage devices, each configured to perform the actions of the methods.

Implementations may include one or more of the following features. The method where varying the at least one of the size or the shape of the at least one tile unit of the high-definition map data is performed based on an expected driving path of the vehicle, and where generating the forward path information includes. The method may also include based on a destination being set for the vehicle, determining the expected driving path of the vehicle as a first path to the destination. The method may also include based on the destination not being set for the vehicle, determining the expected driving path of the vehicle as a second path which has a highest possibility along which the vehicle is driven, based on a location of the vehicle. The method further including: requesting, to the external device, a plurality of main tile units based on the expected driving path. The method may also include based on failure of reception of at least one main tile unit of the plurality of main tile units, requesting, to the external device, sub-tile units constituting the at least one main tile unit for which reception failed. The method further including: receiving, through the telecommunication control unit, vehicle driving information from at least one electrical part provided in the vehicle. The method may also include determining at least one of the size or the shape of the at least one tile unit based on the vehicle driving information. The method further including: transmitting, through the telecommunication control unit, a notification message informing the plurality of tile units to the external device. Implementations of the described techniques may include hardware, a method or process, or computer software on a computer-accessible medium.

All or part of the features described throughout this application can be implemented as a computer program product including instructions that are stored on one or more non-transitory machine-readable storage media, and that are executable on one or more processing devices. All or part of the features described throughout this application can be implemented as an apparatus, method, or electronic system that can include one or more processing devices and memory to store executable instructions to implement the stated functions.

The details of one or more implementations of the subject matter of this disclosure are set forth in the accompanying drawings and the description below. Other features, aspects, and advantages of the subject matter will become apparent from the description, the drawings, and the claims.

BRIEF DESCRIPTION OF THE DRAWINGS

FIG. 1 is a diagram illustrating an example of an appearance of a vehicle according to an implementation of the present disclosure;

FIG. 13 is a flowchart illustrating an example of a path providing method of the path providing device of FIG. 9;

DETAILED DESCRIPTION

According to implementations described herein, high-definition (HD) map data is utilized to generate more detailed and accurate path information according to particular lanes of the road, thus enabling more detailed and accurate lane-based navigation for users.

In some implementations, the HD map data is received in units of tiles (HD map tile units) The size and/or shape of one or more of the HD map tile units may be varied, for example to enable improved storage and processing efficiency of the HD map data.

As such, an object of the present disclosure is to provide a system that efficiently provides electronic horizon data to a vehicle even when the communication environment is poor or data processing is overloaded while driving a vehicle.

Furthermore, another object of the present disclosure is to efficiently provide electronic horizon data to a vehicle even when the communication environment is poor or data processing is overloaded while driving a vehicle.

The present disclosure provides a path providing device that provides a path to a vehicle and a control method thereof.

In some scenarios, implementations of the present disclosure may have one or more of the following technical effects.

According to some implementations of the present disclosure, since a plurality of vehicles encountering each other in a predetermined range is minimized according to the occurrence of an event on a road, the characteristics and situation of a road, problematic bottleneck in the predetermined range is eliminated or minimized.

A vehicle according to an implementation of the present disclosure may be understood as a conception including cars, motorcycles and the like. Hereinafter, the vehicle will be described based on a car.

The vehicle according to the implementation of the present disclosure may be a conception including all of an internal combustion engine car having an engine as a power source, a hybrid vehicle having an engine and an electric motor as power sources, an electric vehicle having an electric motor as a power source, and the like.

In the following description, a left side of a vehicle refers to a left side in a driving direction of the vehicle, and a right side of the vehicle refers to a right side in the driving direction.

FIG. 1 is a diagram illustrating an appearance of a vehicle according to an implementation of the present disclosure.

Figure 2:
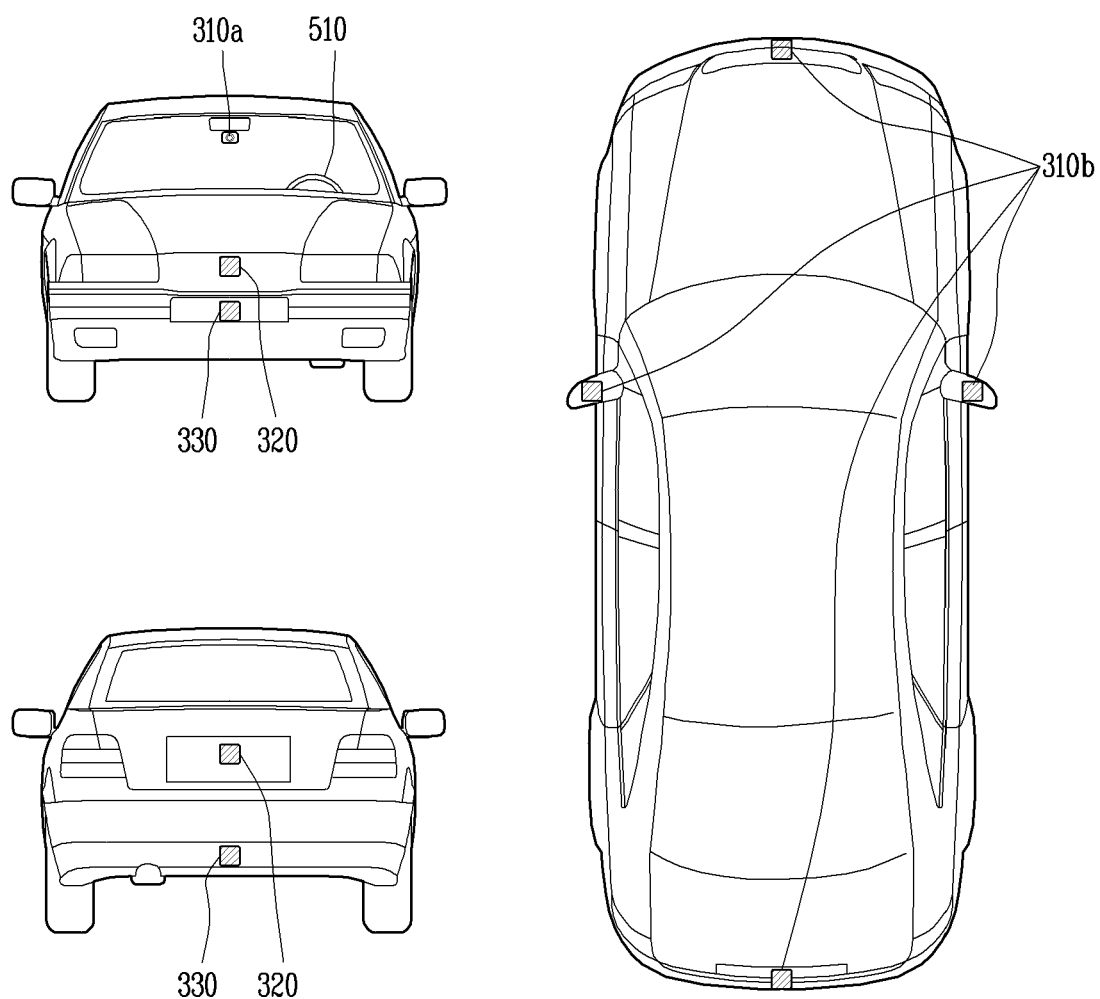
FIG. 2 is a diagram illustrating an example in which a vehicle according to an implementation of the present disclosure is viewed at various angles from the outside.

FIG. 2 is a diagram in which a vehicle according to an implementation of the present disclosure is viewed at various angles from the outside.

Figure 3:
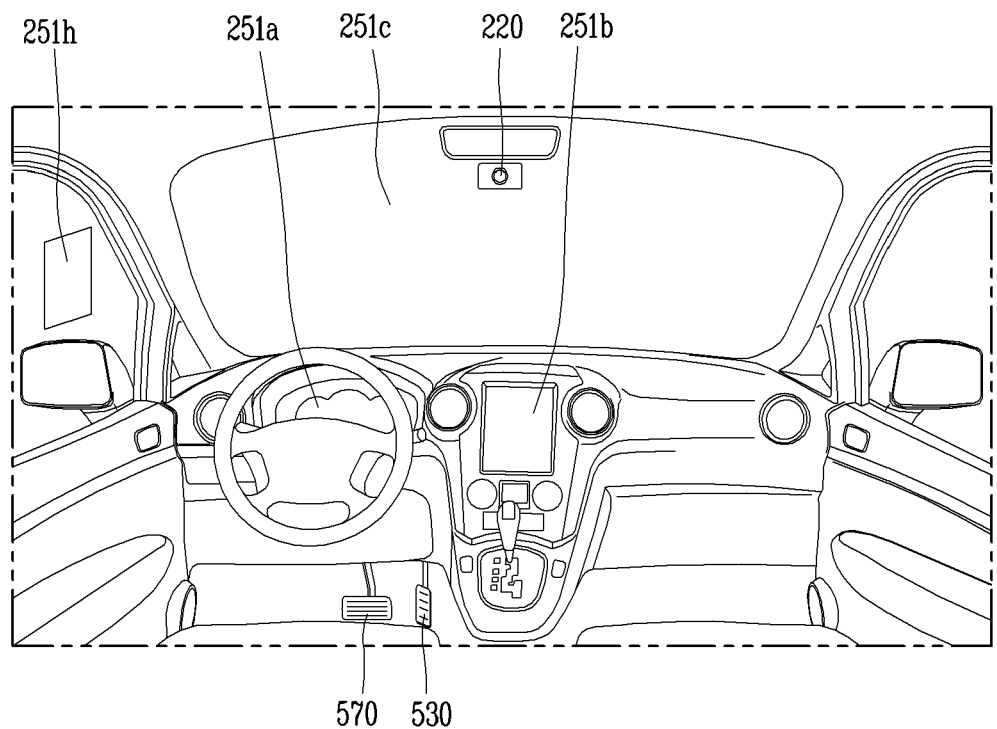
FIGS. 3 and 4 are diagrams illustrating an example of an inside of a vehicle according to an implementation of the present disclosure.
Figure 4:
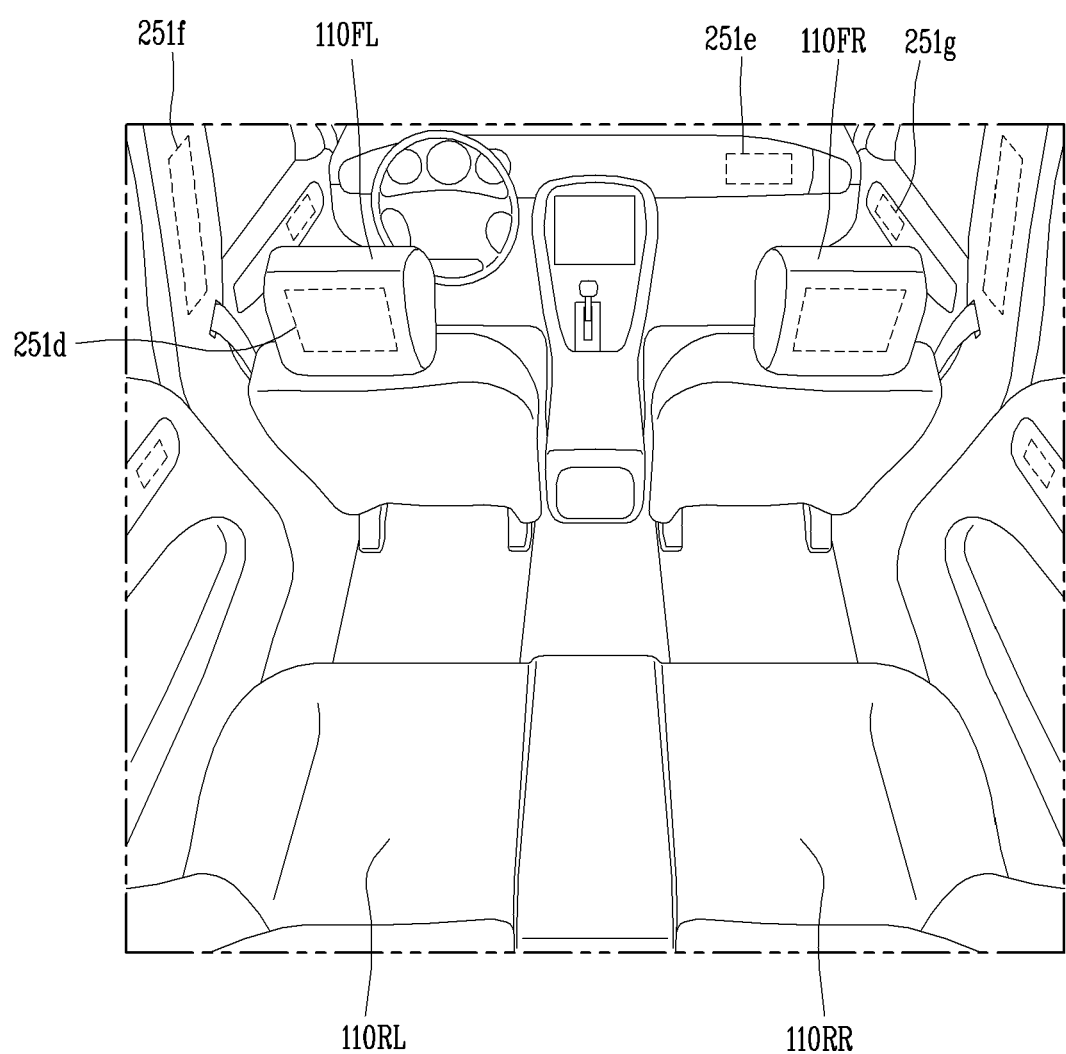

FIGS. 3 and 4 are diagrams illustrating an inside of a vehicle according to an implementation of the present disclosure.

Figure 5:
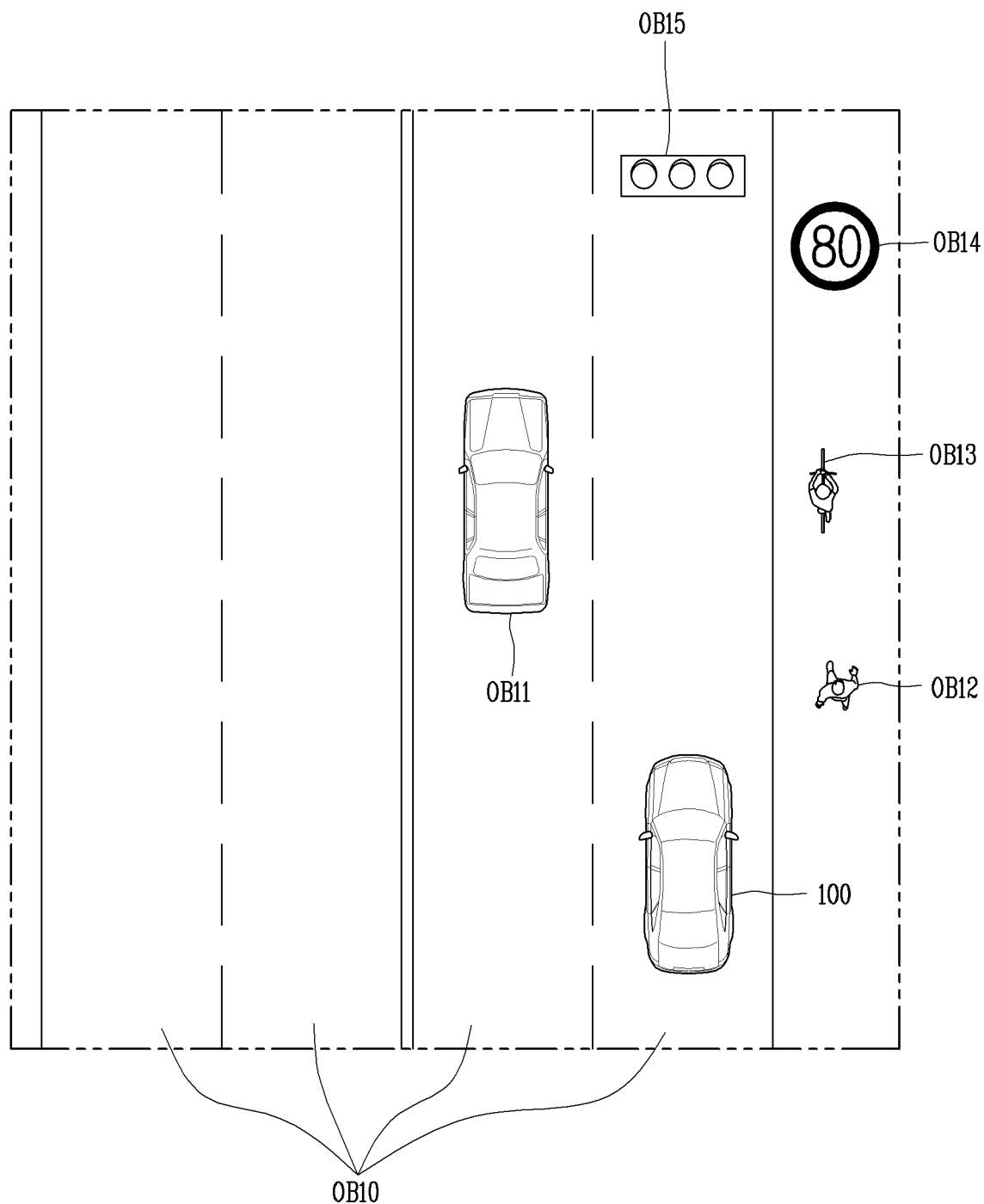
FIGS. 5 and 6 are diagrams referenced to describe examples of objects according to an implementation of the present disclosure.
Figure 6:
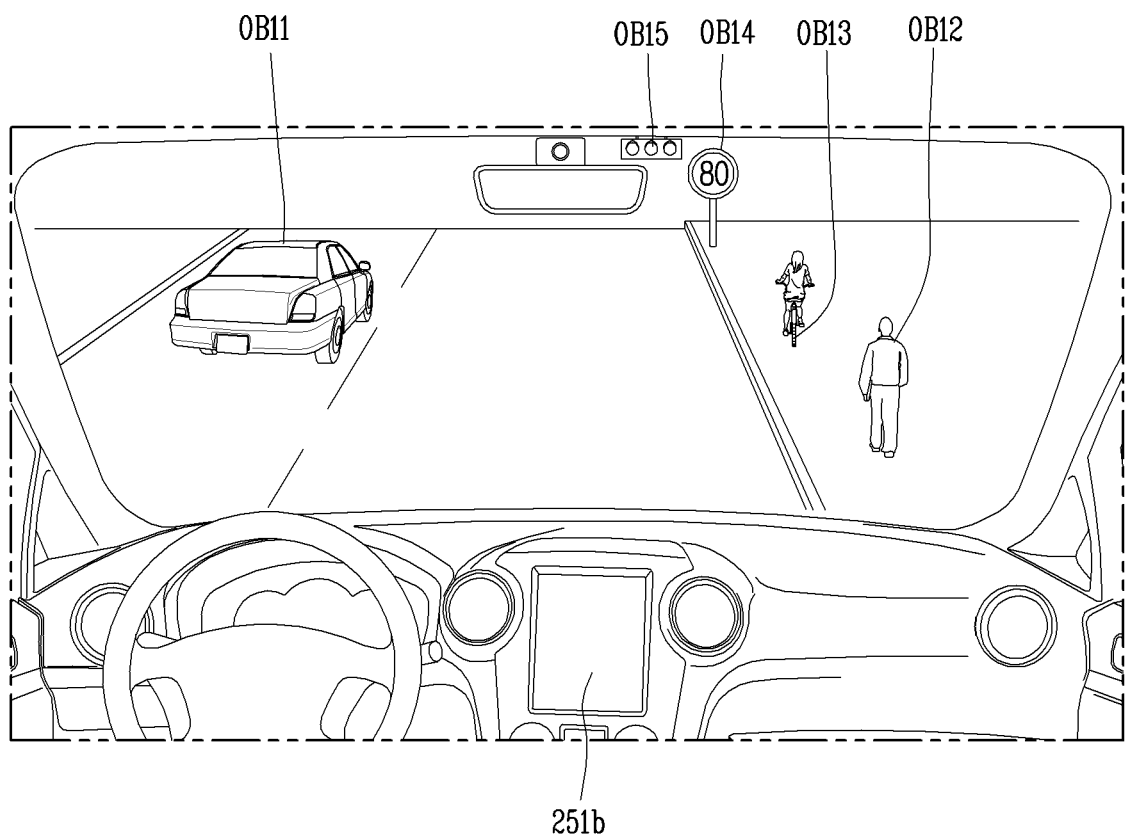

FIGS. 5 and 6 are diagrams referenced to describe objects according to an implementation of the present disclosure.

Figure 7:
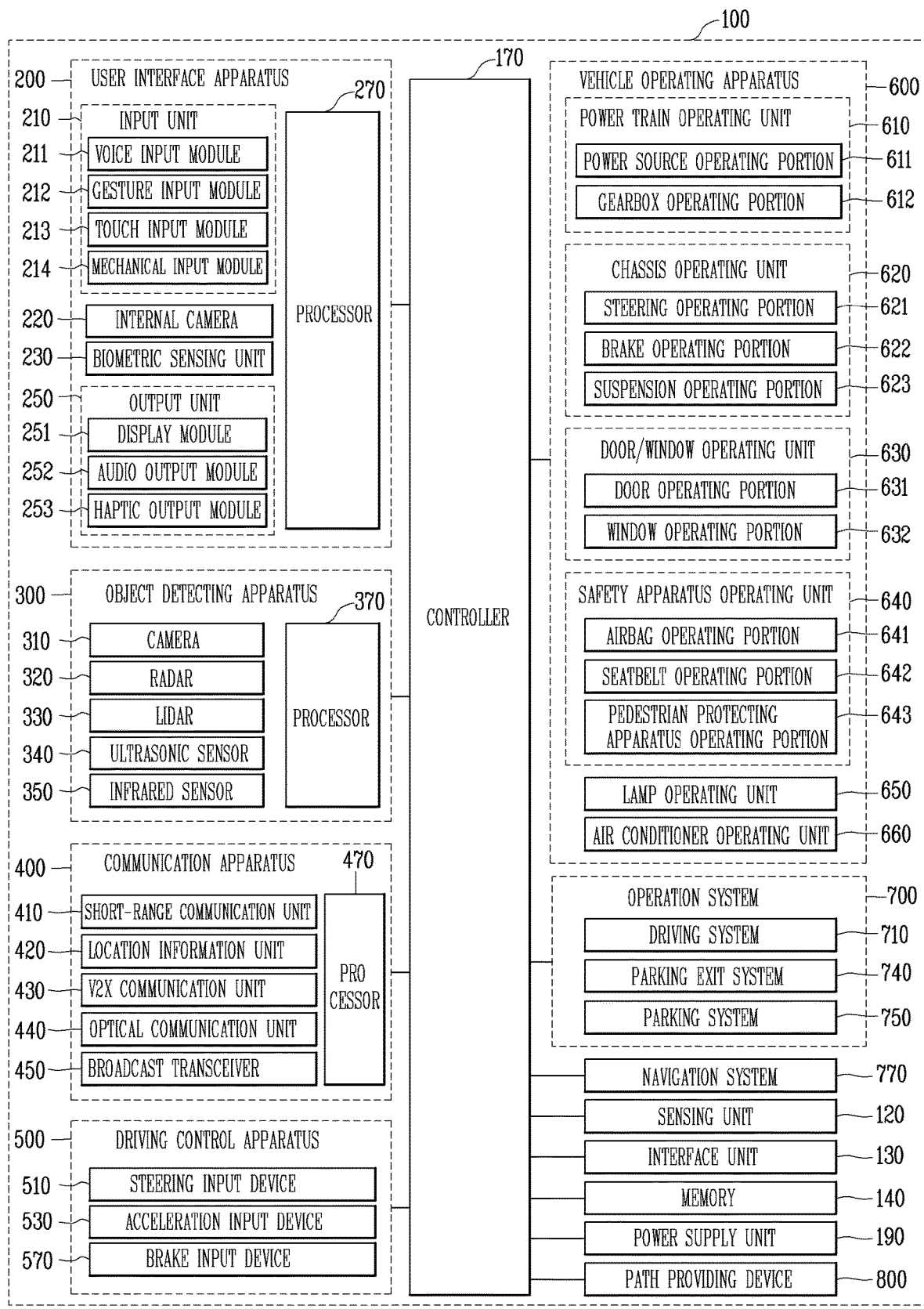
FIG. 7 is a block diagram referenced to describe an example of a vehicle according to an implementation of the present disclosure.

FIG. 7 is a block diagram referenced to describe a vehicle according to an implementation of the present disclosure.

Referring to FIGS. 1 through 7, a vehicle 100 may include wheels turning by a driving force, and a steering apparatus 510 for adjusting a driving (ongoing, moving) direction of the vehicle 100.

The vehicle 100 may be an autonomous vehicle.

In some implementations, the vehicle 100 may be switched into an autonomous mode or a manual mode based on a user input.

For example, the vehicle may be converted from the manual mode into the autonomous mode or from the autonomous mode into the manual mode based on a user input received through a user interface apparatus 200.

The vehicle 100 may be switched into the autonomous mode or the manual mode based on driving environment information. The driving environment information may be generated based on object information provided from an object detecting apparatus 300.

For example, the vehicle 100 may be switched from the manual mode into the autonomous mode or from the autonomous module into the manual mode based on driving environment information generated in the object detecting apparatus 300.

For example, the vehicle 100 may be switched from the manual mode into the autonomous mode or from the autonomous module into the manual mode based on driving environment information received through a communication apparatus 400.

The vehicle 100 may be switched from the manual mode into the autonomous mode or from the autonomous module into the manual mode based on information, data or signal provided from an external device.

When the vehicle 100 is driven in the autonomous mode, the vehicle 100 may be driven based on an operation system 700.

For example, the vehicle 100 may be driven based on information, data or signal generated in a driving system 710, a parking exit system 740 and a parking system 750.

When the vehicle 100 is driven in the manual mode, the vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

As illustrated in the example of FIG. 7, according to some implementations, the vehicle 100 may include a user interface apparatus 200, an object detecting apparatus 300, a communication apparatus 400, a driving control apparatus 500, a vehicle operating apparatus 600, an operation system 700, a navigation system 770, a sensing unit 120, an interface unit 130, a memory 140, a controller 170 and a power supply unit 190.

According to some implementations, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 100 may implement user interfaces (UIs) or user experiences (UXs) through the user interface apparatus 200.

The user interface apparatus 200 may include an input unit 210, an internal camera 220, a biometric sensing unit 230, an output unit 250 and at least one processor, such as processor 270.

According to some implementations, the user interface apparatus 200 may include more components in addition to components to be explained in this specification or may not include some of those components to be explained in this specification.

The input unit 210 may allow the user to input information. Data collected in the input unit 210 may be analyzed by the processor 270 and processed as a user's control command.

The input unit 210 may be disposed within the vehicle. For example, the input unit 210 may be disposed on one area of a steering wheel, one area of an instrument panel, one area of a seat, one area of each pillar, one area of a door, one area of a center console, one area of a headlining, one area of a sun visor, one area of a wind shield, one area of a window or the like.

The input unit 210 may include a voice input module 211, a gesture input module 212, a touch input module 213, and a mechanical input module 214.

The voice input module 211 may convert a user's voice input into an electric signal. The converted electric signal may be provided to the processor 270 or the controller 170.

The voice input module 211 may include at least one microphone.

The gesture input module 212 may convert a user's gesture input into an electric signal. The converted electric signal may be provided to the processor 270 or the controller 170.

The gesture input module 212 may include at least one of an infrared sensor and an image sensor for detecting the user's gesture input.

According to implementations, the gesture input module 212 may detect a user's three-dimensional (3D) gesture input. To this end, the gesture input module 212 may include a light emitting diode outputting a plurality of infrared rays or a plurality of image sensors.

The gesture input module 212 may detect the user's 3D gesture input by a time of flight (TOF) method, a structured light method or a disparity method.

The touch input module 213 may convert the user's touch input into an electric signal. The converted electric signal may be provided to the processor 270 or the controller 170.

The touch input module 213 may include a touch sensor for detecting the user's touch input.

According to an implementation, the touch input module 213 may be integrated with the display unit 251 so as to implement a touch screen. The touch screen may provide an input interface and an output interface between the vehicle 100 and the user.

The mechanical input module 214 may include at least one of a button, a dome switch, a jog wheel, and a jog switch. An electric signal generated by the mechanical input module 214 may be provided to the processor 270 or the controller 170.

The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing module 230 may include a sensor for detecting the user's biometric information and acquire fingerprint information and heart rate information regarding the user using the sensor. The biometric information may be used for user authentication.

The output unit 250 may generate an output related to a visual, audible or tactile signal.

The output unit 250 may include at least one of a display module 251, an audio output module 252 and a haptic output module 253.

The display module 251 may output graphic objects corresponding to various types of information.

The display module 251 may include at least one of a liquid crystal display (LCD), a thin film transistor-LCD (TFT LCD), an organic light-emitting diode (OLED), a flexible display, a three-dimensional (3D) display and an e-ink display.

The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module so as to output information through an image which is projected on a windshield or a window.

The display module 251 may include a transparent display. The transparent display may be attached to the windshield or the window.

The transparent display may have a predetermined degree of transparency and output a predetermined screen thereon. The transparent display may include at least one of a transparent TFEL (Thin Film Electroluminescent), a transparent OLED (Organic Light-Emitting Diode), a transparent LCD (Liquid Crystal Display), a transmissive transparent display, and a transparent LED (Light Emitting Diode) display. The transparent display may have adjustable transparency.

Meanwhile, the user interface apparatus 200 may include a plurality of display modules 251a to 251g.

The display module 251 may be disposed on one area of a steering wheel, one area 521a, 251b, 251e of an instrument panel, one area 251d of a seat, one area 251f of each pillar, one area 251g of a door, one area of a center console, one area of a headlining or one area of a sun visor, or implemented on one area 251c of a windshield or one area 251h of a window.

The audio output module 252 converts an electric signal provided from the processor 270 or the controller 170 into an audio signal for output. To this end, the audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user can recognize such output.

The processor 270 may control an overall operation of each unit of the user interface apparatus 200.

According to an implementation, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

Meanwhile, the user interface apparatus 200 may be called as a display apparatus for vehicle.

The user interface apparatus 200 may operate according to the control of the controller 170.

The object detecting apparatus 300 is an apparatus for detecting an object located at outside of the vehicle 100.

The object may be a variety of objects associated with driving (operation) of the vehicle 100.

Referring to FIGS. 5 and 6, an object O may include a traffic lane OB10, another vehicle OB11, a pedestrian OB12, a two-wheeled vehicle OB13, traffic signals OB14 and OB15, light, a road, a structure, a speed hump, a geographical feature, an animal and the like.

The lane OB01 may be a driving lane, a lane next to the driving lane or a lane on which another vehicle comes in an opposite direction to the vehicle 100. The lanes OB10 may include left and right lines forming a lane.

The another vehicle OB11 may be a vehicle which is moving around the vehicle 100. The another vehicle OB11 may be a vehicle located within a predetermined distance from the vehicle 100. For example, the another vehicle OB11 may be a vehicle which moves before or after the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB13 may refer to a vehicle (transportation facility) that is located near the vehicle 100 and moves using two wheels. The two-wheeled vehicle OB13 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided on another vehicle. The light may be light generated from a streetlamp. The light may be solar light.

The road may include a road surface, a curve, an upward slope, a downward slope and the like.

The structure may be an object that is located near a road and fixed on the ground. For example, the structure may include a streetlamp, a roadside tree, a building, an electric pole, a traffic light, a bridge and the like.

The geographical feature may include a mountain, a hill and the like.

Meanwhile, objects may be classified into a moving object and a fixed object. For example, the moving object may be another vehicle or a pedestrian. The fixed object may be, for example, a traffic signal, a road, or a structure.

The object detecting apparatus 300 may include a camera 310, a radar 320, a lidar 330, an ultrasonic sensor 340, an infrared sensor 350 and at least one processor, such as processor 370.

According to an implementation, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310a, an AVM (Around View Monitoring) camera 310b, or a 360-degree camera.

For example, the camera 310 may be disposed adjacent to a front windshield within the vehicle to acquire a front image of the vehicle. Or, the camera 310 may be disposed adjacent to a front bumper or a radiator grill.

For example, the camera 310 may be disposed adjacent to a rear glass within the vehicle to acquire a rear image of the vehicle. Or, the camera 310 may be disposed adjacent to a rear bumper, a trunk or a tail gate.

For example, the camera 310 may be disposed adjacent to at least one of side windows within the vehicle to acquire a side image of the vehicle. Or, the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented by a Frequency Modulated Continuous Wave (FMCW) scheme or a Frequency Shift Keying (FSK) scheme according to a signal waveform in a continuous wave radar scheme.

The radar 320 may detect an object in a time of flight (TOF) manner or a phase-shift manner through the medium of electromagnetic waves, and detect a position of the detected object, a distance from the detected object and a relative speed with the detected object.

The radar 320 may be disposed on an appropriate position outside the vehicle for detecting an object which is located at a front, rear or side of the vehicle.

The lidar 330 may include laser transmitting and receiving portions. The lidar 330 may be implemented in a time of flight (TOF) manner or a phase-shift manner.

The lidar 330 may be implemented as a drive type or a non-drive type.

For the drive type, the lidar 330 may be rotated by a motor and detect object near the vehicle 100.

For the non-drive type, the lidar 330 may detect, through light steering, objects which are located within a predetermined range based on the vehicle 100. The vehicle 100 may include a plurality of non-drive type lidars 330.

The lidar 330 may detect an object in a time of flight (TOF) manner or a phase-shift manner through the medium of laser light, and detect a position of the detected object, a distance from the detected object and a relative speed with the detected object.

The lidar 330 may be disposed on an appropriate position outside the vehicle for detecting an object located at the front, rear or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 350 may detect an object based on infrared light, and detect a position of the detected object, a distance from the detected object and a relative speed with the detected object.

The infrared sensor 350 may be disposed on an appropriate position outside the vehicle for detecting an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor 370 may detect an object based on reflected infrared light which emitted infrared light is reflected from the object, and track the object. The processor 370 may execute operations, such as a calculation of a distance from the object, a calculation of a relative speed with the object and the like, based on the infrared light.

According to an implementation, the object detecting apparatus 300 may include a plurality of processors 370 or may not include any processor 370. For example, each of the camera 310, the radar 320, the lidar 330, the ultrasonic sensor 340 and the infrared sensor 350 may include the processor in an individual manner.

When the processor 370 is not included in the object detecting apparatus 300, the object detecting apparatus 300 may operate according to the control of a processor of an apparatus within the vehicle 100 or the controller 170.

The object detecting apparatus 300 may operate according to the control of the controller 170.

The communication apparatus 400 is an apparatus for performing communication with an external device. Here, the external device may be another vehicle, a mobile terminal or a server.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450, and at least one processor, such as processor 470.

According to an implementation, the communication apparatus 400 may further include other components in addition to the components described, or may not include some of the components described.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (vehicle to infrastructure; V2I), another vehicle (vehicle to vehicle; V2V), or a pedestrian (vehicle to pedestrian; V2P). The V2X communication unit 430 may include an RF circuit capable of implementing a communication protocol with an infrastructure (V2I), a communication protocol between vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

According to an implementation, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The processor 470 may control an overall operation of each unit of the communication apparatus 400.

According to an implementation, the communication apparatus 400 may include a plurality of processors 470 or may not include any processor 470.

When the processor 470 is not included in the communication apparatus 400, the communication apparatus 400 may operate according to the control of a processor of another device within the vehicle 100 or the controller 170.

Meanwhile, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate according to the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530 and a brake input device 570.

The steering input device 510 may receive an input regarding a driving (ongoing) direction of the vehicle 100 from the user. The steering input device 510 is preferably configured in the form of a wheel allowing a steering input in a rotating manner. According to some implementations, the steering input device may also be configured in a shape of a touch screen, a touchpad or a button.

The acceleration input device 530 may receive an input for accelerating the vehicle 100 from the user. The brake input device 570 may receive an input for braking the vehicle 100 from the user. Each of the acceleration input device 530 and the brake input device 570 is preferably configured in the form of a pedal. According to some implementations, the acceleration input device or the brake input device may also be configured in a shape of a touch screen, a touch pad or a button.

The driving control apparatus 500 may operate according to the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

According to some implementations, the vehicle operating apparatus 600 may further include other components in addition to the components described, or may not include some of the components described.

Meanwhile, the vehicle operating apparatus 600 may include at least one processor. Each unit of the vehicle operating apparatus 600 may individually include at least one processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine can be controlled. The power source operating portion 611 may adjust the engine output torque according to the control of the controller 170.

For example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N) or parking (P).

Meanwhile, when an engine is the power source, the gearbox operating portion 612 may adjust a locked state of a gear in the drive (D) state.

The chassis operating unit 620 may control an operation of a chassis device.

The chassis operating unit 620 may include a steering operating portion 621, a brake operating portion 622 and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

Meanwhile, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

Meanwhile, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, 110RR using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

The lamp operating portion 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include at least one processor. Each unit of the vehicle operating apparatus 600 may individually include at least one processor.

The vehicle operating apparatus 600 may operate according to the control of the controller 170.

The operation system 700 is a system that controls various driving modes of the vehicle 100. The operation system 700 may be operated in the autonomous driving mode.

The operation system 700 may include a driving system 710, a parking exit system 740 and a parking system 750.

According to implementations, the operation system 700 may further include other components in addition to components to be described, or may not include some of the components to be described.

Meanwhile, the operation system 700 may include at least one processor. Each unit of the operation system 700 may individually include at least one processor.

Meanwhile, according to some implementations, the operation system may implemented by the controller 170 when it is implemented in a software configuration.

Meanwhile, according to implementation, the operation system 700 may be implemented by at least one of the user interface apparatus 200, the object detecting apparatus 300, the communication apparatus 400, the vehicle operating apparatus 600 and the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600 and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600 and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770, transmit a control signal to the vehicle operating apparatus 600, and park the vehicle 100.

The parking system 750 may receive object information from the object detecting apparatus 300, transmit a control signal to the vehicle operating apparatus 600 and park the vehicle 100.

The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information according to the set destination, information regarding various objects on a path, lane information and current location information of the vehicle.

The navigation system 770 may include a memory and at least one processor. The memory may store the navigation information. The at least one processor may control an operation of the navigation system 770.

According to implementations, the navigation system 770 may update prestored information by receiving information from an external device through the communication apparatus 400.

According to implementations, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

Meanwhile, the interface unit 130 may serve as a path for supplying electric energy to the connected mobile terminal.

When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be various storage apparatuses such as a ROM, a RAM, an EPROM, a flash drive, a hard drive, and the like in terms of hardware. The memory 140 may store various data for overall operations of the vehicle 100, such as programs for processing or controlling the controller 170.

According to implementations, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

Meanwhile, the vehicle 100 according to the present disclosure may include a path providing device 800.

The path providing device 800 may control at least one of those components illustrated in FIG. 7. From this perspective, in some implementations, the path providing device 800 may be implemented by the controller 170.

Alternatively, in some implementations, the path providing device 800 may be a separate device, independent of the controller 170. When the path providing device 800 is implemented as a component independent of the controller 170, the path providing device 800 may be provided on a part of the vehicle 100.

Hereinafter, description will be given of implementations in which the path providing device 800 is a component which is separate from the controller 170, for the sake of explanation. As such, according to implementations described in this disclosure, the functions (operations) and control techniques described in relation to the path providing device 800 may be executed by the controller 170 of the vehicle. However, in general, the path providing device 800 may be implemented by one or more other components in various ways.

Furthermore, the path providing device 800 described herein may include some of the components illustrated in FIG. 7 and various components included in the vehicle. For the sake of explanation, the components illustrated in FIG. 7 and the various components included in the vehicle will be described with separate names and reference numbers.

Hereinafter, a method of autonomously driving a vehicle associated with the present disclosure in an optimized manner or priding path information optimized for driving a vehicle will be described in more detail with reference to the accompanying drawings.

Figure 8:
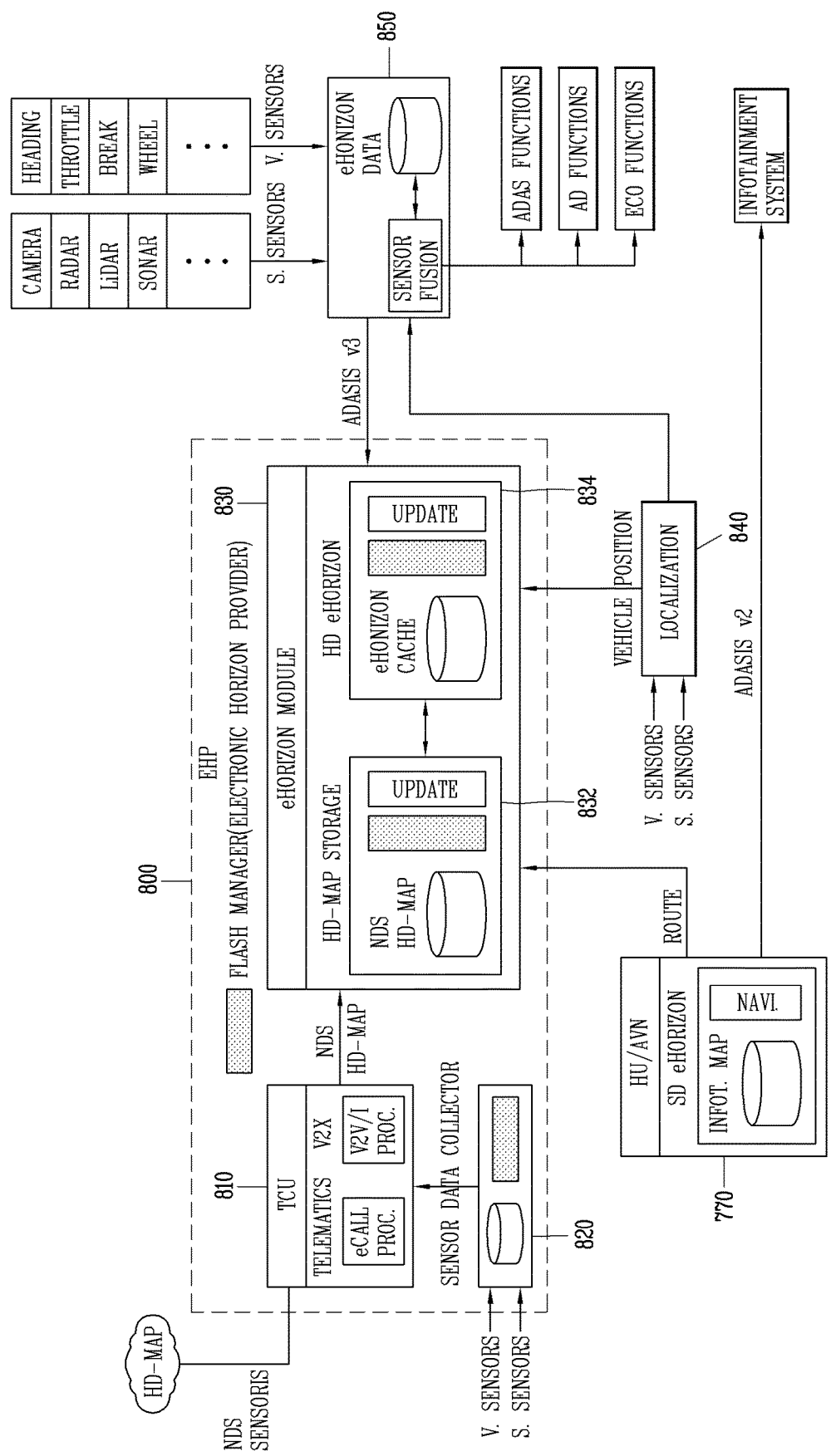
FIG. 8 is a diagram illustrating an example of an electronic horizon provider (EHP) associated with some implementations of the present disclosure.

FIG. 8 is a diagram for explaining an electronic horizon provider (EHP) associated with the present disclosure.

Referring to FIG. 8, a path providing device 800 associated with the present disclosure may control a vehicle 100 on the basis of eHorizon.

The path providing device 800 may be an EHP (Electronic Horizon Provider).

Here, Electronic Horizon may be referred to as "ADAS Horizon," "ADASIS Horizon," "Extended Driver Horizon" or "eHorizon."

The eHorizon may be understood as software, a module or a system that performs the functions of generating a vehicle's forward path information (e.g., using high-definition (HD) map data), configuring the vehicle's forward path information based on a specified standard (protocol) (e.g., a standard specification defined by the ADAS), and transmitting the configured vehicle forward path information to an application (e.g., an ADAS application, a map application, etc.) which may be installed in a module (for example, an ECU, a controller 170, a navigation system 770, etc.) of the vehicle or in the vehicle requiring map information (or path information).

In some systems, the vehicle's forward path (or a path to the destination) is only provided as a single path based on a navigation map (or a path to the destination).

By contrast, according to some implementations described in the present disclosure, eHorizon may provide lane-based path information based on a high-definition (HD) map. For example, by utilizing HD map data, more detailed and precise lane-based path information may be generated according to particular lanes of the road, thus enabling more detailed and accurate navigation for a user.

The data generated by eHorizon may be referred to as "electronic Horizon data" or "eHorizon data."

The electronic horizon data may be described with driving plan data used when generating a driving control signal of the vehicle 100 in a driving system. For example, the electronic horizon data may be understood as driving plan data within a range from a point where the vehicle 100 is located to the horizon.

Here, the horizon may be understood as a point in front of a predetermined distance from a point where the vehicle 100 is located, on the basis of a preset driving path. The horizon may denote a point at which the vehicle 100 can reach after a preset period of time from a point where the vehicle 100 is located along a preset driving path. Here, the driving path denotes a driving path to the final destination, and may be set by a user input.

The electronic horizon data may include horizon map data and the horizon pass data. The horizon map data may include at least one of topology data, ADAS data, HD map data, and dynamic data. According to an implementation, the horizon map data may include a plurality of layers. For example, the horizon map data may include a first layer matched with topology data, a second layer matched with ADAS data, a third layer matched with HD map data, and a fourth layer matched with dynamic data. The horizon map data may further include static object data.

The topology data may be described as a map created by connecting the center of the road. The topology data is suitable for roughly indicating the location of a vehicle, and may be in the form of data used primarily in navigation for a driver. The topology data may be understood as data on road information excluding information on lanes. The topology data may be generated based on data received at an infrastructure via V2I. The topology data may be based on data generated by the infrastructure. The topology data may be based on data stored in at least one memory provided in the vehicle 100.

The ADAS data may denote data related to road information. The ADAS data may include at least one of slope data of roads, curvature data of roads, and speed limit data of roads. The ADAS data may further include no overtaking section data. The ADAS data may be based on data generated by the infrastructure 20. The ADAS data may be based on data generated by the object detecting apparatus 300. The ADAS data may be referred to as road information data.

The HD map data may include topology information in a detailed lane unit of roads, connection information of each lane, feature information (e.g., traffic sign, lane marking/attribute, road furniture, etc.) for localization of a vehicle. The HD map data may be based on data generated by the infrastructure.

The dynamic data may include various dynamic information that can be generated on a road. For example, the dynamic data may include construction information, variable speed lane information, road surface state information, traffic information, moving object information, and the like. The dynamic data may be based on data received from the infrastructure 20. The dynamic data may be based on data generated by the object detecting apparatus 300.

The path providing device 800 may provide map data within a range from a point where the vehicle 100 is located to a horizon. The horizon pass data may be described as a trajectory that can be taken by the vehicle 100 within a range from a point where the vehicle 100 is located to a horizon. The horizon pass data may include data indicating a relative probability of selecting any one road at a decision point (e.g., a crossroad, a junction, an intersection, etc.). The relative probability may be calculated based on time taken to arrive at the final destination. For example, when the time taken to arrive at the final destination in case of selecting a first road is shorter than that in case of selecting a second road at a decision point, the probability of selecting the first road may be calculated higher than that of selecting the second road.

The horizon pass data may include a main path and a sub path. The main path may be understood as a trajectory connecting roads with a relatively high probability of being selected. The sub path may be branched from at least one decision point on the main path. The sub path may be understood as a trajectory connecting at least any one road having a low relative probability of being selected on at least one decision point on the main path.

eHorizon may be classified into categories such as software, a system, and the like. The eHorizon denotes a configuration in which road shape information on a high-definition map under a connected environment such as an external server (cloud server), V2X (vehicle to everything) or the like and real-time events such as real-time traffic signs, road surface conditions, accidents and the like are merged to provide relevant information to autonomous driving systems and infotainment systems.

In other words, eHorizon may perform the role of transferring a precision map road shape and real time events in front of the vehicle to autonomous driving systems and infotainment systems under an external server/V2X environment.

In order to effectively transfer eHorizon data (information) transmitted (generated) from the eHorizon to autonomous driving systems and infotainment systems, a data specification and transmission method may be formed in accordance with a technical standard called "ADASIS (Advanced Driver Assistance Systems Interface Specification)."

The vehicle control device associated with the present disclosure may use information received (generated) from eHorizon for autonomous driving systems and/or infotainment systems.

For example, autonomous navigation systems may use information provided by eHorizon in the safety and ECO aspects.

In terms of the safety aspect, the vehicle 100 according to the present disclosure may perform an ADAS (Advanced Driver Assistance System) function such as LKA (Lane Keeping Assist), TJA (Traffic Jam Assist) or the like, and/or an AD (AutoDrive) function such as advance, road joining, lane change or the like using road shape information and event information received from eHorizon and surrounding object information sensed through sensors (e.g., in the localization unit 840) provided in the vehicle.

Furthermore, in terms of the ECO aspect, the path providing device 800 may receive inclination information, traffic light information, and the like on a front road from eHorizon to control the vehicle so as to achieve efficient engine output, thereby enhancing fuel efficiency.

The infotainment system may include convenience aspects.

For an example, the vehicle 100 may receive accident information, road surface condition information, and the like on a front road received from eHorizon to output them on a display unit (for example, HUD (Head Up Display), CID, Cluster, etc.) provided in the vehicle to provide guide information for allowing the driver to perform safe driving.

The eHorizon may receive the location information of various event information (e.g., road surface condition information, construction information, accident information, etc.) generated from a road and/or road specific speed limit information from the present vehicle 100 or other vehicles or collect them from an infrastructure (e.g., a measuring device, a sensing device, a camera, etc.) installed on a road.

Furthermore, the event information and the road specific speed limit information may be linked to map information or may be updated.

In addition, the location information of the event information may be divided into units of lanes.

Using the information, the eHorizon (or EHP) of the present disclosure may provide information required for autonomous driving system and infotainment systems to each vehicle based on a precision map capable of determining a road situation (or road information) in units of lanes.

In other words, the eHorizon provider (EHP) of the present disclosure may provide an absolute high-definition map using an absolute coordinate of information (for example, event information, location information of the present vehicle 100, etc.) associated with a road based on a high-definition map.

The information associated with a road provided by the eHorizon may be provided with information provided within a predetermined region (predetermined space) with respect to the present vehicle 100.

The EHP (Electronic Horizon Provider) may be understood as a component included in the eHorizon system to perform a function provided by the eHorizon (or eHorizon system).

The path providing device 800 of the present disclosure may be an EHP, as illustrated in FIG. 8.

According to some implementations, the path providing device 800 (EHP) of the present disclosure may receive a high-definition map (e.g., from an external server or cloud server), generate path information to a destination (e.g., in units of particular lanes of a road), and transmit the high-definition map and the path information (e.g., generated in units of lanes of the road) to a module or application (or program) of another vehicle that may need the map information and path information.

As a result, in some implementations, by utilizing high-definition map data, more detailed and precise path information may be generated according to particular lanes of the road, thus enabling more detailed and accurate lane-based navigation information for the user.

Referring to FIG. 8, an example of the overall structure of the electronic horizon system according to some implementations of the present disclosure is illustrated in FIG. 8.

The path providing device 800 (EHP) of the present disclosure may include a telecommunication control unit (TCU) 810 for receiving a high-definition (HD) map existing in a cloud server.

The telecommunication control unit 810 may be a communication apparatus 400 described above, and may include at least one of components included in the communication apparatus 400.

The telecommunication control unit 810 may include a telematics module or a V2X (vehicle to everything) module.

The telecommunication control unit 810 may receive a high-definition (HD) map according to the Navigation Data Standard (NDS) (or conforming to the NDS standard) from a cloud server.

In addition, the high-definition (HD) map may be updated by reflecting data sensed through a sensor provided in a vehicle and/or a sensor installed on an adjacent road according to a sensor ingestion interface specification (SENSORIS) which is a sensor ingestion interface specification.

The telecommunication control unit 810 may download a HD-map from a cloud server through the telematics module or the V2X module.

The path providing device 800 (EHP) of the present disclosure may include a sensor data collection unit 820. The sensor data collection unit 820 may collect (receive) information sensed through sensors (for example, sensors (V. sensors) (e.g., heading, throttle, break, wheel, etc.) for sensing the operation of a vehicle) and sensors (S. sensors) (e.g., camera, radar, LiDAR, sonar, etc.) for sensing the surrounding information of a vehicle).

The sensor data collection unit 820 may transmit the information sensed through the sensors provided in a vehicle to the telecommunication control unit 810 (or at least one processor, such as processor 830) to reflect the information on the high-definition map.

The telecommunication control unit 810 may update the high-definition map stored in the cloud server by transmitting the information transmitted from the sensor data collection unit 820 to the cloud server.

The path provision apparatus 800 (EHP) of the present disclosure may include a processor 830 (or an eHorizon module).

The processor 830 may control the telecommunication control unit 810 and the sensor data collection unit 820.

The processor 830 may store a high-definition map received through the telecommunication control unit 810, and update the high-definition map using information received through the sensor data collection unit 820. Such an operation may be carried out in the storage unit 832 of the processor 830.

The processor 830 may receive first path information from an AVN (Audio Video Navigation) or a navigation system 770.

The first path information, as path information provided in some systems, may simply be information for guiding a driving path to a destination. As such, the first path information provided in some systems provides only one path information, and does not distinguish between different lanes of the road.

On the other hand, according to implementations described in the present disclosure, when the processor 830 receives the first path information, the processor 830 may generate second path information for guiding a driving path to a destination set in the first path information in units of lanes (e.g., according to particular lanes of the road) using a high-definition (HD) map and the first path information. Such an operation may be carried out in the operation unit 834 of the processor 830.

Therefore, in some implementations, by utilizing HD map data, more detailed and precise forward path information may be generated according to particular lanes of the road, thus enabling more detailed and accurate lane-based navigation for the user.

In addition, the eHorizon system may include a localization unit 840 for locating a vehicle using information sensed through sensors (V. sensors, S. sensors) provided in the vehicle.

The localization unit 840 may transmit the location information of the vehicle to the processor 830 so as to match the location of the vehicle detected using the sensors provided in the vehicle with the high-definition map.

The processor 830 may match the location of the vehicle 100 to the high-definition map based on the location information of the vehicle.

The processor 830 may generate electronic horizon data. The processor 830 may generate horizon pass data.

The processor 830 may generate the electronic horizon data by reflecting the driving environment of the vehicle 100. For example, the processor 830 may generate the electronic horizon data based on the driving direction data and the driving speed data of the vehicle 100.

The processor 830 may merge the generated electronic horizon data with previously generated electronic horizon data. For example, the processor 830 may positionally connect horizon map data generated at a first time point with horizon map data generated at a second time point. For example, the processor 830 may positionally connect horizon pass data generated at a first time point with horizon pass data generated at a second time point.

The processor 830 may include a memory, an HD map processing unit, a dynamic data processing unit, a matching unit, and a path generation unit.

The HD map processing unit may receive HD map data from a server via the communication device. The HD map processing unit may store the HD map data. According to an implementation, the HD map processing unit may process and refine the HD map data. The dynamic data processing unit may receive dynamic data from the object detecting apparatus. The dynamic data processing unit may receive dynamic data from the server. The dynamic data processing unit may store dynamic data. According to an implementation, the dynamic data processing unit 172 may process and refine the dynamic data.

The matching unit may receive a HD map from the HD map processing unit 171. The matching unit may receive dynamic data from the dynamic data processing unit. The matching unit may generate horizon map data by matching the HD map data and the dynamic data.

According to an implementation, the matching unit may receive topology data. The matching unit may ADAS data. The matching unit may generate horizon map data by matching the topology data, the ADAS data, the HD map data, and the dynamic data. The path generation unit may generate horizon pass data. The path generation unit may include a main path generation unit and a sub path generation unit. The main path generation unit may generate main pass data. The sub path generation unit may generate sub pass data.

Furthermore, the eHorizon system may include a merge unit 850 that merges information (data) sensed by sensors provided in the vehicle with eHorizon data formed by the eHorizon module (controller).

For example, the merge unit 850 may update a high-definition map by merging sensor data sensed in the vehicle to a high-definition map corresponding to eHozion data, and provide the updated high-definition map to an ADAS function, an AD (AutoDrive) function or an ECO function.

In addition, in some implementations, the merge unit 850 may also provide the updated high-definition map to the infotainment system.

In FIG. 8, it is illustrated that the path providing device 800 (EHP) of the present disclosure includes only the telecommunication control unit 810, the sensor data collection unit 820, and the processor 830, but the present disclosure is not limited thereto.

The path providing device 800 (EHP) of the present disclosure may further include at least one of a localization unit 840 and a merge unit 850.

In addition, the path providing device 800 (EHP) of the present disclosure may further include a navigation system 770.

Through the above arrangement, when at least one of the localization unit 840, the merge unit 850, and the navigation system 770 is included in the path providing device 800 (EHP) of the present disclosure, it may be understood that the function/operation/control carried out by the component included therein is carried out by the processor 830.

Figure 9:
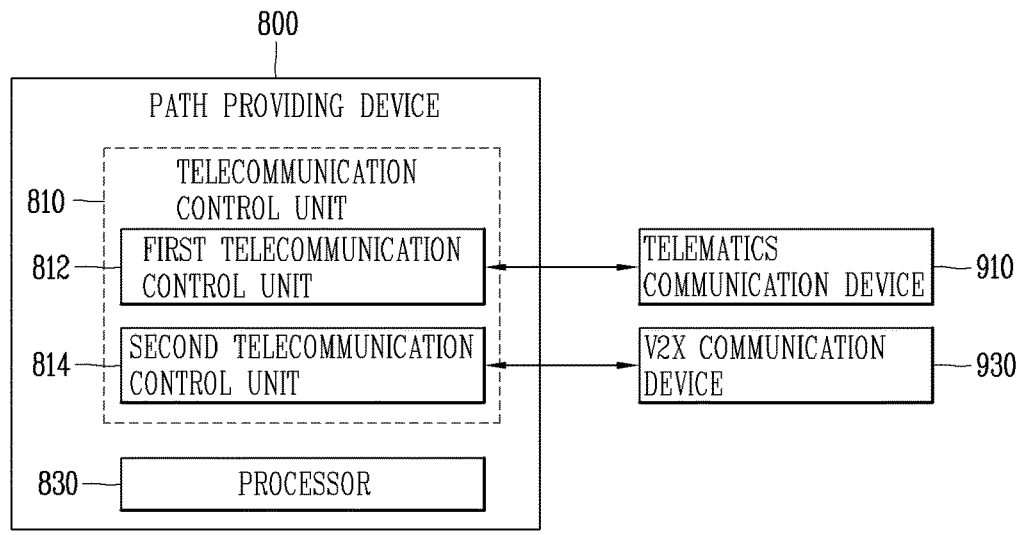
FIG. 9 is a block diagram illustrating an example of a path providing device (e.g., the path providing device of FIG. 8) in more detail.

FIG. 9 is a block diagram for explaining the path providing device of FIG. 8 in more detail.

The path providing device denotes a device for providing a path to a vehicle.

For example, the path providing device may be a device mounted on a vehicle to perform communication via CAN communication, and generate a message for controlling a vehicle and/or an electrical part mounted on the vehicle.

For another example, the path providing device may be located outside the vehicle, such as a server or a communication device, to communicate with the vehicle through a mobile communication network. In this case, the path providing device may remotely control the vehicle and/or the electrical part mounted on the vehicle using the mobile communication network.

The path providing device 800 is provided in the vehicle, and may be configured with an independent device that is attachable and detachable from the vehicle, or may be a component of the vehicle installed integrally with the vehicle.

Referring to FIG. 9, the path providing device 800 includes a telecommunication control unit 810 and a processor 830.

The telecommunication control unit 810 is configured to perform communication with various components provided in the vehicle.

For an example, the communication unit 810 may receive various information provided through a controller area network (CAN).

The telecommunication control unit 810 includes a first telecommunication control unit 812, and the first telecommunication control unit 812 may receive a high-definition map provided through telematics. In other words, the first telecommunication control unit 812 performs "telematics communication." The telematics communication may perform communication with a server or the like using a satellite navigation system satellite or a base station provided by mobile communication such as 4G and 5G.

The first telecommunication control unit 812 may perform communication with a telematics communication device 910. The telematics communication device may include a server provided by a portal provider, a vehicle provider, and/or a mobile communication company.

The processor 830 of the path providing device 800 of the present disclosure may determine the absolute coordinates of information (event information) related to a road based on the ADAS MAP received from an external server (eHorizon) through the telecommunication control unit 812. In addition, the processor 830 may perform autonomous driving or vehicle control on the present vehicle using the absolute coordinates of information (event information) related to the road.

The telecommunication control unit 810 includes a second telecommunication control unit 814, and the second telecommunication control unit 814 may receive various information provided through V2X (Vehicle to everything). In other words, the second telecommunication control unit 814 is configured to perform "V2X communication." V2X communication may be defined as a technology that exchanges information such as traffic situation while communicating with road infrastructure and other vehicles while driving.

The second telecommunication control unit 814 may perform communication with a V2X communication device 930. The V2X communication device may include a mobile terminal possessed by a pedestrian or a bicycle rider, a stationary terminal installed on a road, another vehicle, and the like.

Here, the another vehicle may denote at least one of vehicles existing within a predetermined distance with respect to the present vehicle 100 or vehicles entering a predetermined distance with respect to the present vehicle 100.

The present disclosure may not be necessarily limited thereto, and the another vehicle may include all vehicles capable of communicating with the telecommunication control unit 810. In the present specification, for the sake of convenience of explanation, a case where the nearby vehicle exists within a predetermined distance from the present vehicle 100 or enters within the predetermined distance will be described as an example.

The predetermined distance may be determined based on a communicable distance through the communication unit 810, determined according to the specification of a product, or may be determined or varied based on a user's setting or the standard of V2X communication.

The second telecommunication control unit 814 may be formed to receive LDM data from another vehicle. The LDM data may be a V2X message (BSM, CAM, DENM, etc.) transmitted and received between vehicles through V2X communication.

The LDM data may include the location information of another vehicle.

Based on the location information of the present vehicle and the location information of another vehicle included in LDM data received through the second telecommunication control unit 814, the processor 830 may determine a relative location between the present vehicle and another vehicle.

Furthermore, the LDM data may include the speed information of another vehicle. The processor 830 may also determine a relative speed of another vehicle using the speed information of the present vehicle and the speed information of the another vehicle. The speed information of the present vehicle may be calculated using a degree to which the location information of the vehicle changes over time or calculated based on information received from the driving control apparatus 500 or the power train operating unit 610 of the vehicle 100.

The second telecommunication control unit 814 may be the V2X communication unit 430 described above.

The telecommunication control unit 810 may receive information related to the driving of the vehicle from most of the electrical parts provided in the vehicle. Information transmitted from an electrical part provided in the vehicle 100 to the path providing device 800 is referred to as "vehicle driving information."

The vehicle driving information includes vehicle information and surrounding information of the vehicle. The information related to an inside of the vehicle with respect to the frame of the vehicle 100 may be defined as vehicle information, and the information related to an outside of the vehicle may be defined as surrounding information.

Vehicle information denotes information on the vehicle itself. For example, the vehicle information may include at least one of a driving speed of the vehicle, a driving direction, an acceleration, an angular speed, a position (GPS), a weight, a number of vehicle occupants, a braking force of the vehicle, a maximum braking force of the vehicle, an air pressure of each wheel, a centrifugal force applied to the vehicle, a driving mode of the vehicle (whether it is an autonomous driving mode or a manual driving mode), a parking mode of the vehicle (autonomous parking mode, automatic parking mode, manual parking mode), whether or not a user is on board the vehicle, information related to the user, and the like.

The surrounding information denotes information relate to another object located within a predetermined range around the vehicle and information related to the outside of the vehicle. The surrounding information of the vehicle may be a state of road surface (frictional force) on which the vehicle is traveling, weather, a distance from a front-side (rear-side) vehicle, a relative speed of a front-side (rear-side) vehicle, a curvature of curve when a driving lane is the curve, an ambient brightness of the vehicle, information associated with an object existing in a reference region (predetermined region) based on the vehicle, whether or not an object enters (or leaves) the predetermined region, whether or not a user exists around the vehicle, and information associated with the user (for example, whether or not the user is an authenticated user), and the like.

In addition, the surrounding information may include an ambient brightness, a temperature, a sun position, surrounding object information (a person, a vehicle, a sign, etc.), a type of road surface during driving, a geographic feature, line information, driving lane Information, and information required for autonomous driving/autonomous parking/automatic parking/manual parking mode.

Furthermore, the surrounding information may further include a distance from an object existing around the vehicle to the vehicle, a possibility of collision, a type of the object, a parking space for the vehicle, an object for identifying the parking space (e.g., a parking line, a string, another vehicle, a wall, etc.), and the like.

The vehicle driving information is not limited to the example described above and may include all information generated from the components provided in the vehicle.

Meanwhile, the processor 830 is configured to control one or more devices provided in the vehicle using the telecommunication control unit 810.

Specifically, the processor 830 may determine whether at least one of a plurality of preset conditions is satisfied based on vehicle driving information received through the communication unit 810. Depending on the satisfied conditions, the processor 830 may control the one or more electrical parts in different ways.

In connection with the preset condition, the processor 830 may sense the occurrence of an event in an electronic unit and/or application provided in the vehicle and determine whether the sensed event satisfies the preset condition. At this time, the processor 830 may detect the occurrence of an event from information received through the communication unit 810.

The application may be implemented, for example, as a widget, a home launcher, and the like, and refer to various types of programs that can be executed on the vehicle. Accordingly, the application may be a program that performs various functions, such as a web browser, video playback, message transmission/reception, schedule management, and application update.

In addition, the application may include forward collision warning (FCW), blind spot detection (BSD), lane departure warning (LDW), pedestrian detection (PD), curve speed warning (CSW), and turn-by-turn navigation (TBT).

For example, an event may occur when there is a missed call, when there is an application to be updated, when a message arrives, start on, start off, autonomous driving on/off, LCD awake key, alarm, incoming call, missed notification, or the like.

For another example, an event may occur when a warning set by an advanced driver assistance system (ADAS) occurs or a function set by the ADAS is performed. For example, when a forward collision warning occurs, when a blind spot detection occurs, when a lane departure warning occurs, when a lane keeping assist warning occurs, when autonomous emergency braking function is performed, or the like may be seen as an occurrence of an event.

For still another example, when changed from a forward gear to a reverse gear, when an acceleration greater than a predetermined value is generated, when a deceleration greater than a predetermined value is generated, when a power device is changed from an internal combustion engine to a motor, when changed from the motor to the internal combustion engine, or the like may also be seen as an occurrence of an event.

In addition, when various ECUs provided in the vehicle perform a specific function may also be seen as an occurrence of an event.

For an example, when the occurred event satisfies a preset condition, the processor 830 controls the telecommunication control unit 810 to display information corresponding to the satisfied condition on the one or more displays.

Figure 10:
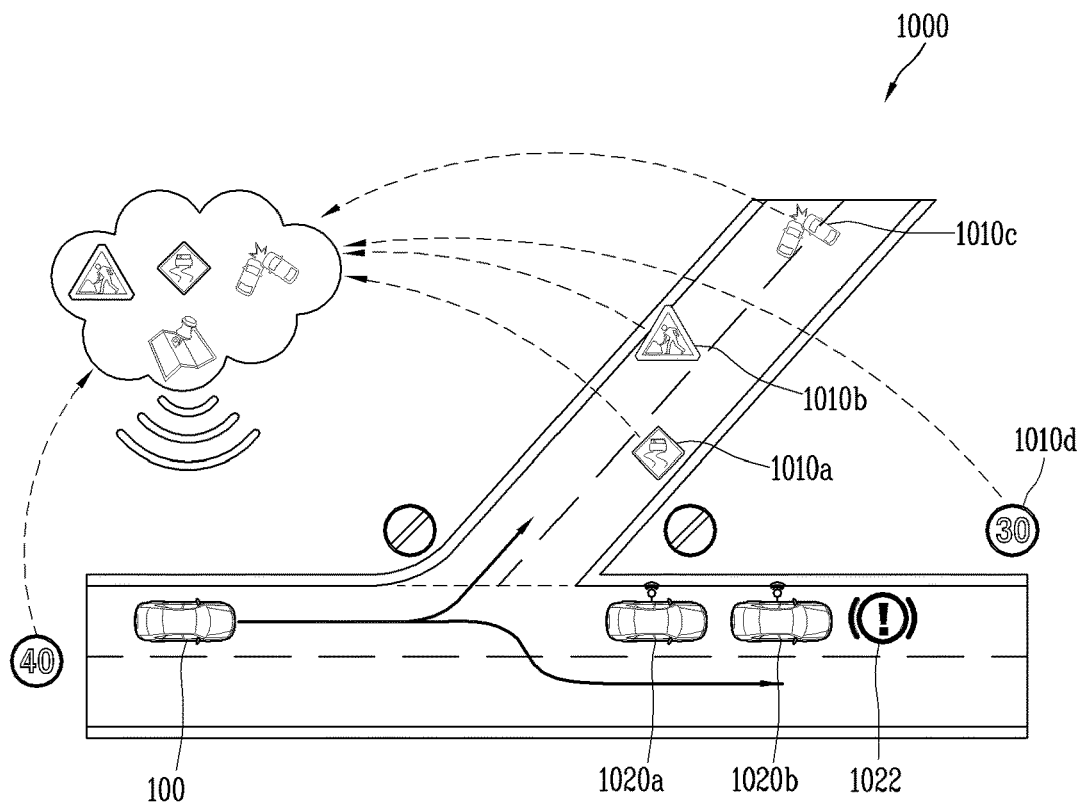
FIG. 10 is a diagram illustrating an example of eHorizon associated with some implementations of the present disclosure.

FIG. 10 is a conceptual diagram for explaining eHorizon associated with the present disclosure.

Referring to FIG. 10, the path providing device 800 associated with the present disclosure may allow a vehicle 100 to autonomously drive on the basis of eHorizon.

eHorizon may be classified into categories such as software, a system, and the like. eHorizon denotes a configuration in which road shape information on a precision map under a connected environment such as an external server (cloud), V2X (vehicle to everything) or the like and real-time events such as real-time traffic signs, road surface conditions, accidents and the like are merged to provide relevant information to autonomous driving systems and infotainment systems.

For an example, eHorizon may refer to an external server (or cloud, cloud server).

In other words, eHorizon may perform the role of transferring a precision map road shape and real time events in front of the vehicle to autonomous driving systems and infotainment systems under an external server/V2X environment.

In order to effectively transfer eHorizon data (information) transmitted from the eHorizon (i.e., external server) to autonomous driving systems and infotainment systems, a data specification and transmission method may be formed in accordance with a technical standard called "ADASIS (Advanced Driver Assistance Systems Interface Specification)."

The path providing device 800 associated with the present disclosure may use information received from eHorizon for autonomous driving systems and/or infotainment systems.

For example, autonomous navigation systems may be divided into safety aspects and ECO aspects.

In terms of the safety aspect, the path providing device 800 according to the present disclosure may perform an ADAS (Advanced Driver Assistance System) function such as LKA (Lane Keeping Assist), TJA (Traffic Jam Assist) or the like, and/or an AD (AutoDrive) function such as advance, road joining, lane change or the like using road shape information and event information received from eHorizon and surrounding object information sensed through sensors (e.g., in the localization unit 840) provided in the vehicle.

Furthermore, in terms of the ECO aspect, the path providing device 800 may receive inclination information, traffic light information, and the like on a front road from eHorizon to control the vehicle so as to achieve efficient engine output, thereby enhancing fuel efficiency.

The infotainment system may include convenience aspects.

For an example, the path providing device 800 may receive accident information, road surface condition information, and the like on a front road received from eHorizon to output them on a display unit (for example, HUD (Head Up Display), CID, Cluster, etc.) provided in the vehicle to provide guide information for allowing the driver to perform safe driving.

Referring to FIG. 10, the eHorizon (external server) may receive the location information of various event information (e.g., road surface condition information 1010a, construction information 1010b, accident information 1010c, etc.) generated from a road and/or road specific speed limit information 1010d from the present vehicle 100 or other vehicles 1020a, 1020b or collect them from an infrastructure (e.g., a measuring device, a sensing device, a camera, etc.) installed on a road.

Furthermore, the event information and the road specific speed limit information may be linked to map information or may be updated.

In addition, the location information of the event information may be divided into units of lanes.

Using the information, the eHorizon (external server) of the present disclosure may provide information required for autonomous driving system and infotainment systems to each vehicle based on a precision map capable of determining a road situation (or road information) in units of lanes of the road.

In other words, the eHorizon (external server) of the present disclosure may provide an absolute high-definition map using an absolute coordinate of information (for example, event information, location information of the present vehicle 100, etc.) associated with a road based on a precision map.

The information associated with a road provided by the eHorizon may be provided only within a predetermined region (predetermined space) with respect to the present vehicle 100.

On the other hand, the path providing device 800 of the present disclosure may acquire location information of another vehicle through communication with the another vehicle. Communication with another vehicle may be carried out through V2X (vehicle to everything) communication, and data transmitted and received to and from another vehicle through V2X communication may be data in a format defined by the LDM (Local Dynamic Map) standard.

The LDM denotes a conceptual data storage located in a vehicle control unit (or ITS station) including information related to a safe and normal operation of an application (or application program) provided in a vehicle (or an intelligent transport system (ITS)). The LDM may, for example, comply with EN standards.

The LDM differs from the ADAS MAP described above in the data format and transmission method. For an example, the ADAS MAP corresponds to a high-definition map having absolute coordinates received from eHorizon (external server), and the LDM may denote a high-definition map having relative coordinates based on data transmitted and received through V2X communication.

The LDM data (or LDM information) is data that is mutually transmitted and received in V2X communication (vehicle to everything) (for example, V2V (vehicle to vehicle) communication, V2I (vehicle to infrastructure) communication, V2P (vehicle to pedestrian) communication.

The LDM may be implemented, for example, by a storage for storing data transmitted and received in V2X communication, and the LDM may be formed (stored) in a vehicle control device provided in each vehicle.

The LDM data may denote, for example, data that is mutually transmitted and received between a vehicle and a vehicle (infrastructure, pedestrian) or the like. The LDM data may include, for example, a Basic Safety Message (BSM), a Cooperative Awareness Message (CAM), a Decentralized Environmental Notification Message (DENM), and the like.

The LDM data may be referred to as, for example, a V2X message or an LDM message.

The vehicle control device related to the present disclosure may efficiently manage LDM data (or V2X message) transmitted and received between vehicles efficiently using an LDM.

Based on LDM data received through V2X communication, the LDM may store all relevant information (e.g., the present vehicle (another vehicle) location, speed, traffic light status, weather information, road surface condition, etc.) on a traffic condition (or a road condition for an area within a predetermined distance from a place where a vehicle is currently located) around a place where a vehicle is currently located, and distribute them to other vehicles and continuously update them.

For an example, a V2X application provided in the path providing device 800 registers with the LDM, and receives specific messages such as all DENMs including a warning about a faulty vehicle. Then, the LDM automatically allocates the received information to the V2X application, and the V2X application may control the vehicle based on information allocated from the LDM.

In this manner, the vehicle of the present disclosure may control the vehicle using an LDM formed by LDM data collected through V2X communication.

The LDM associated with the present disclosure may provide information related to a road to the vehicle control device. The information related to a road provided by the LDM provides only relative distances and relative speeds between other vehicles (or generated event points), other than map information with absolute coordinates.

In other words, the vehicle of the present disclosure may construct autonomous driving using an ADAS MAP (absolute coordinate high-definition map) according to the ADASIS standard provided by eHorizon, but the ADAS MAP may be used only to determine a road condition in a surrounding area of the present vehicle (an own vehicle).

In addition, the vehicle of the present disclosure may construct autonomous driving using an LDM (relative coordinate high-definition map) formed by LDM data received through V2X communication, but there is a limit in that accuracy is inferior due to insufficient absolute location information.

The vehicle control device included in the vehicle of the present disclosure may generate a merged precision map using the LDM data received through the VAS communication with the ADAS MAP received from eHorizon and controls the vehicle in an optimized manner using the fusion precision map (Self-driving).

Figure 11A:
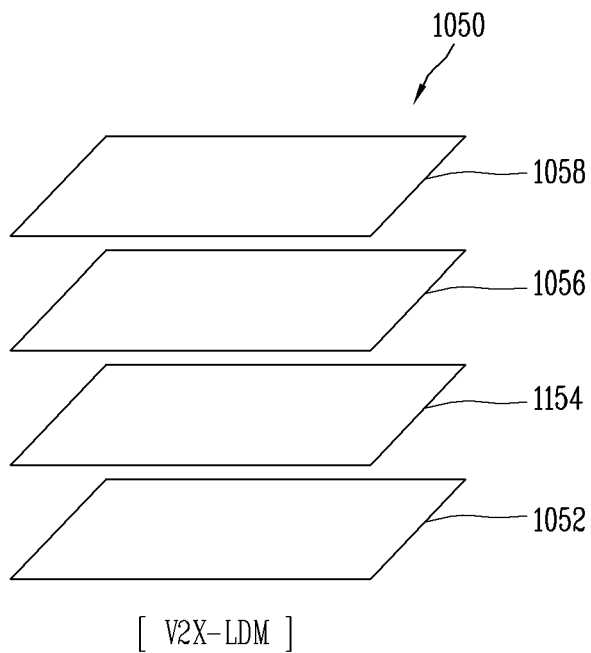
FIGS. 11A and 11B are diagrams illustrating examples of an LDM (Local Dynamic Map) and an ADAS (Advanced Driver Assistance System) MAP associated with implementations of the present disclosure.
Figure 11B:
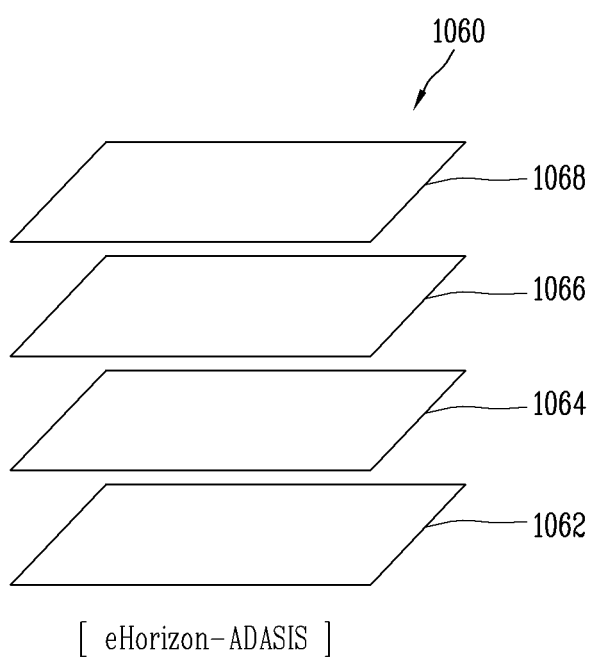

An example of a data format of the LDM data (or LDM) transmitted and received between vehicles through V2X communication is illustrated in FIG. 11A, and an example of a data format of the ADAS MAP received from an external server (eHorizon) is illustrated in FIG. 11B.

First, referring to FIG. 11A, the LDM data (or LDM) 1050 may be formed to have four layers.

The LDM data 1050 may include a first layer 1052, a second layer 1054, a third layer 1056, and a fourth layer 1058.

The first layer 1052 may be referred to as Type-1. The first layer 1052 may include static information, for example, map information, among information related to a road, as permanent static data.

The second layer 1054 may be referred to as Type-2. The second layer 1054 may include landmark information (e.g., specific place information specified by a maker among a plurality of place information included in the map information) among information related to the road, as transient static data. The landmark information may include location information, name information, size information, and the like. Moreover, the second layer 1054 may include road furniture located on a road such as guard rails or sign faces.

The third layer 1056 may be referred to as Type-3. The third layer 1056 may include information (e.g., traffic light information, construction information, accident information, etc.) among information related to the road, as transient dynamic data. The construction information, the accident information and the like may include location information. For example, construction section information, construction lane information, variable speed lane, road surface condition, traffic, and weather may be included in the third layer 1056.

The fourth layer 1058 may be referred to as Type-4. The fourth layer 1058 may include dynamic information (e.g., object information, pedestrian information, other vehicle information, etc.) among information related to the road, as highly dynamic data. The object information, pedestrian information, and other vehicle information may include location information. In other words, the fourth layer 1068 includes information related to a moving object, for example, pedestrian information, other vehicle information, bicycle information, and the like.

In other words, the LDM data 1050 may include information sensed through the sensing unit of another vehicle or information sensed through the sensing unit of the present vehicle, and may include information related to a road that is modified in real time as it goes from a first layer to a fourth layer.

Referring to the example of FIG. 11B, in some implementations, the ADAS MAP may be formed to have four layers similar to the LDM data.

The ADAS MAP 1060 may denote data received from eHorizon and formed to conform to the ADASIS standard.

The ADAS MAP 1060 may include a first layer 1062 to a fourth layer 1068.

The first layer 1062 may be referred to as a topology layer or a layer-1.

The first layer 1062 may include topology information. The topology information, as information that explicitly defines a spatial relationship, for an example, and may refer to map information. The first layer 1062 is suitably adapted to roughly display the location of the vehicle as a map made by connecting road center lines.

The second layer 10640 may be referred to as an ADAS layer or a layer-2.

The second layer 1064 may include landmark information (e.g., specific place information specified by a maker among a plurality of place information included in the map information) among information related to the road. The landmark information may include location information, name information, size information, and the like. The landmark information may include traffic sign information indicating speed limit, no-passing, slope, road bend curvature, and the like. The vehicle and/or an electrical part provided in the vehicle may display infotainment information using information included in the second layer 1064, or may execute engine output control, headlamp horizontal angle control, speed limit cruise control, and the like.

The third layer 1066 may be referred to as a HD map and localization layer or layer-3.

The third layer 1066 may include detailed topology information of a road in units of lanes, connection information of each lane, and features for localization of a vehicle. Moreover, the third layer 1066 is provided with the attributes of a lane such as the color, shape, and type of a lane in units of lanes, and may include road furniture located on a road such as guard rails or sign faces.

The fourth layer 1068 may be referred to as a dynamic layer or layer-4.

The fourth layer 1068 may include various dynamic information that may occur on a road. For example, construction section information, construction lane information, variable speed lane, road surface condition, traffic, and weather may be included as dynamic information.

In other words, the ADAS MAP 1060 may include information related to a road that is modified in real time as it goes from the first layer to the fourth layer, such as the LDM data 1050.

The processor 830 may autonomously drive the vehicle 100.

For example, the processor 830 may autonomously drive the vehicle 100 based on vehicle driving information sensed from various electrical parts provided in the vehicle 100 and information received through the telecommunication control unit 810.

Specifically, the processor 830 may control the communication unit 810 to acquire the location information of the vehicle. For example, the processor 830 may acquire the location information (location coordinates) of the present vehicle 100 through the location information unit 420 of the communication unit 810.

Furthermore, the processor 830 may control the first telecommunication control unit 812 of the telecommunication control unit 810 to receive map information from an external server. Here, the first telecommunication control unit 812 may receive an ADAS MAP from the external server (eHorizon). The map information may be included in the ADAS MAP.

Furthermore, the processor 830 may control the second telecommunication control unit 814 of the telecommunication control unit 810 to receive the location information of another vehicle from the another vehicle. Here, the second telecommunication control unit 814 may receive LDM data from another vehicle. The location information of the another vehicle may be included in the LDM data.

The another vehicle denotes a vehicle existing within a predetermined distance from the vehicle, and the predetermined distance may be a communication available distance of the communication unit 810 or a distance set by a user.

The processor 830 may control the communication unit to receive map information from an external server and the location information of another vehicle from the another vehicle.

In addition, the processor 830 may merge the acquired location information of the vehicle and the received location information of the another vehicle into the received map information, and control the vehicle 100 based on at least one of the merged map information and information related to the vehicle sensed through sensors (e.g., in the location unit 840).

Here, map information received from the external server may denote high-definition map information (HD-MAP) included in an ADAS MAP (e.g., ADAS MAP 1060 in FIG. 11B). For example, the high-definition map information may indicate information related to the road in units of lanes (e.g., particular lanes of a road).

The processor 830 may merge the location information of the present vehicle 100 and the location information of another vehicle into the map information in units of lanes (e.g., lanes of a road). In addition, the processor 830 may merge information related to the road received from an external server and information related to the road received from another vehicle into the map information in units of lanes (e.g., lanes of a road).

The processor 830 may generate an ADAS MAP necessary for the control of the vehicle using the ADAS MAP received from the external server and information related to the vehicle received through sensors (e.g., in the localization unit 840).

Specifically, the processor 830 may apply information related to the vehicle sensed within a predetermined range through sensors (e.g., in the localization unit 840) to map information received from the external server.

Here, the predetermined range may be an available distance from which an electrical part provided in the present vehicle 100 senses information, or may be a distance set by a user.

The processor 830 may apply the information related to the vehicle sensed within a predetermined range through the sensing unit to the map information and then additionally merge the location information of another vehicle therewith to control the vehicle.

In other words, when the information related to the vehicle sensed within a predetermined range through the sensing unit is applied to the map information, the processor 830 may use only the information within the predetermined range from the vehicle, and thus a range capable of controlling the vehicle may be geographically narrow.

However, the location information of another vehicle received through the V2X module may be received from the another vehicle existing in a space out of the predetermined range. It is because a communication available distance of the V2X module communicating with other vehicles through the V2X module is farther than a predetermined range of sensors (e.g., in the localization unit 840).

As a result, the processor 830 may merge the location information of other vehicles included in LDM data received through the second telecommunication control unit 814 with map information on which information related to the vehicle is sensed to acquire the location information of other vehicles existing in a wider range, and more effectively control the vehicle using the merged information.

For example, it is assumed that a plurality of other vehicles are densely packed forward in a lane in which the present vehicle exists, and also assumed that the sensing unit can sense only the location information of a vehicle right in front of the present vehicle.

In this case, when only information related to the vehicle sensed within a predetermined range is used in the map information, the processor 830 may generate a control command for controlling the vehicle to allow the present vehicle to pass and overtake a vehicle in front.

However, in reality, there may be a situation in which a plurality of other vehicles are densely packed forward, and it is not easy to pass and overtake.

At this time, the present disclosure may acquire the location information of other vehicles received through the V2X module. At this time, the received location information of the other vehicles may acquire the location information of not only a vehicle right in front of the present vehicle 100 but also a plurality of other vehicles in front of the front vehicle.

The processor 830 may additionally merge the location information of a plurality of vehicles acquired through the V2X module with map information to which information related to the vehicle is applied to determine whether it is an inadequate situation to pass and overtake a vehicle in front.

Through the foregoing configurations, implementations of the present disclosure may merge only information related to the vehicle acquired through sensors (e.g., in the localization unit 840) into high-definition map information to overcome the technical limitations of the related art that allows autonomous driving only in a predetermined range. As such, implementations of the present disclosure may use not only information related to another vehicle received from the another vehicle at a distance greater than the predetermined range through the V2X module, but may also use information related to the vehicle sensed through the sensing unit, thereby performing vehicle control in a more accurate and stable manner.

The vehicle control described in the present specification may include at least one of autonomously driving the vehicle 100 and outputting a warning message related to driving of the vehicle.

Hereinafter, a method of allowing the processor to control a vehicle using LDM data received through the V2X module, an ADAS MAP received from an external server (eHorizon), and information related to the vehicle sensed through the sensing unit provided in the vehicle will be described in more detail with reference to the accompanying drawings.

Figure 12A:
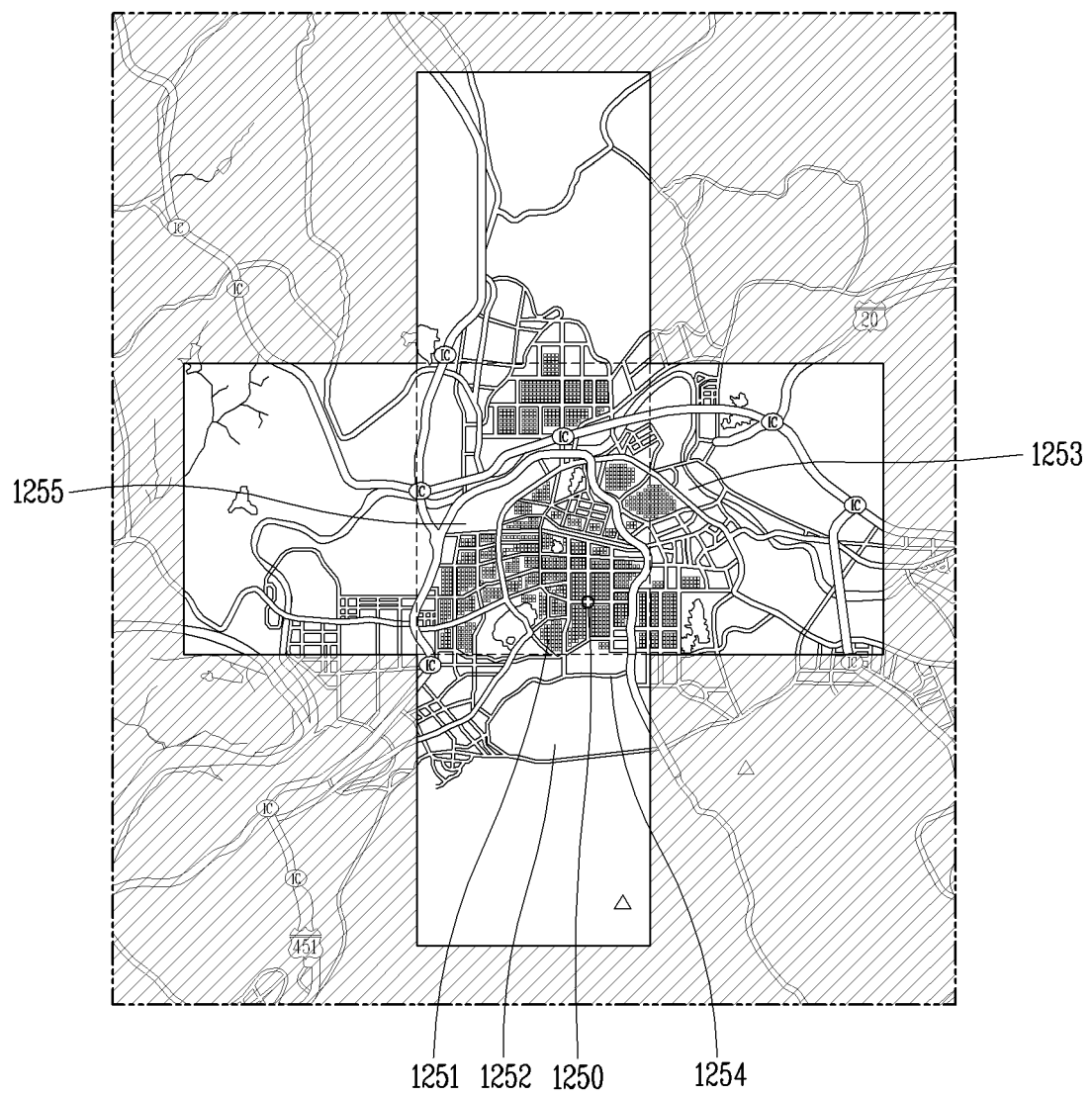
FIGS. 12A and 12B are diagrams illustrating examples of receiving a high-definition map data by a communication apparatus according to an implementation of the present disclosure.
Figure 12B:
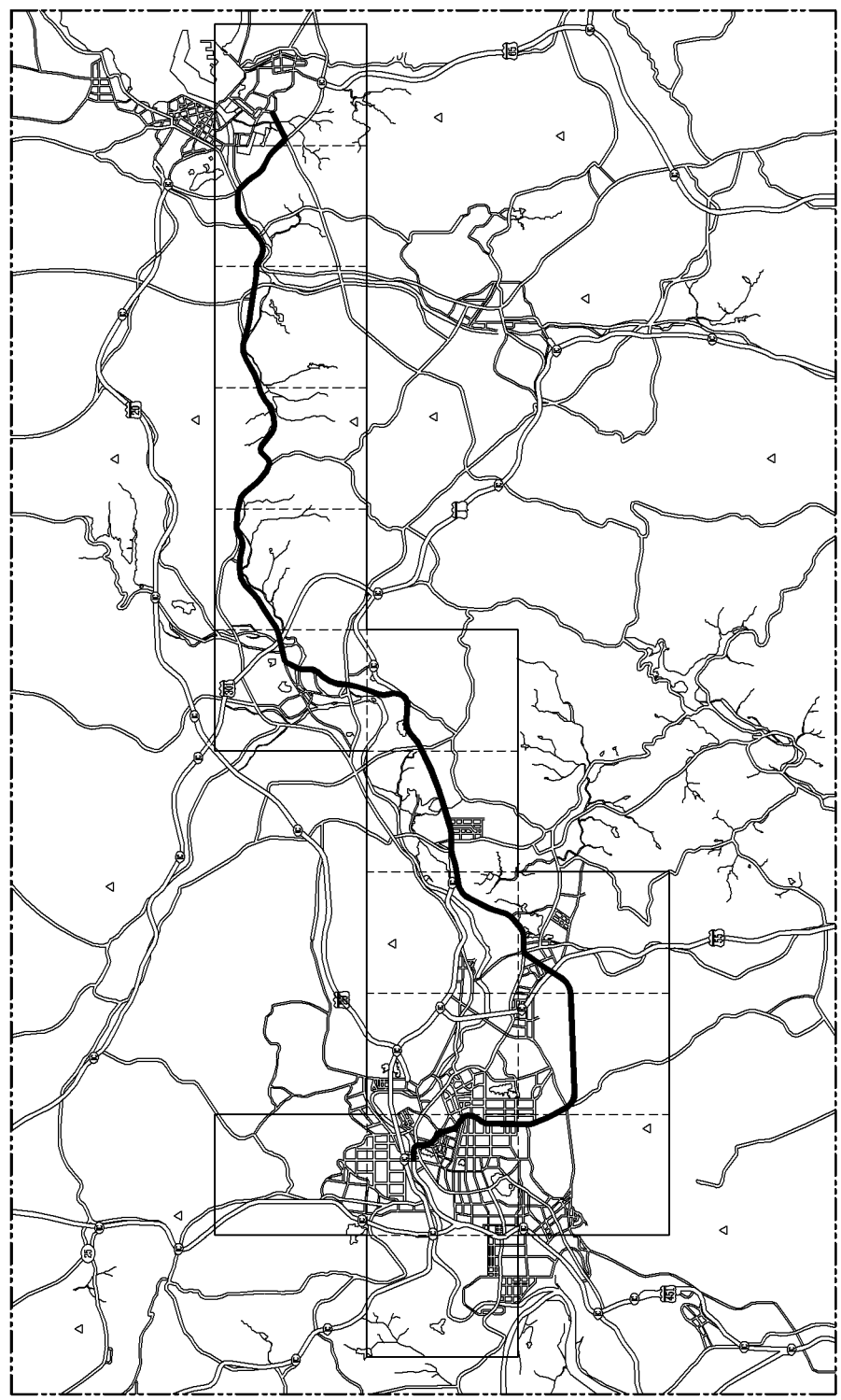

FIGS. 12A and 12B are exemplary diagrams illustrating a method of receiving a high-definition map data by a communication apparatus according to an implementation of the present disclosure.

In some implementations, the HD map data may be divided (e.g., by the server) into tile units, and the HD map data in tile units may be provided to the path providing device 800. The processor 830 may receive the HD map data in units of tiles (e.g., from a server or another vehicle) through the telecommunication control unit 810. Herein, the HD map data received in units of tiles is referred to as "HD map tiles" below.

As such, the HD map data may be partitioned into tiles. The tiles may have a predetermined shape, and each tile may correspond to a different part of the map. In some implementations, when all the tiles are connected, entire HD map data is acquired. In some implementations, the HD map data has a high capacity, and a high-capacity memory is implemented for the vehicle 100 to download and use the entire HD map data. However, in some implementations, it may be more efficient to download, use, and delete the HD map data in units of tiles rather than providing a high-capacity memory in the vehicle 100, with the development of communication technology.

In general, the tiles of the HD map data may be any suitable shape. However, in the present disclosure, for convenience of explanation, examples are described where tiles are a predetermined shape of a rectangle. However, the tiles of the HD map data may be any of various polygonal shapes.

The processor 830 may store the downloaded HD map tiles in the memory 140. The processor 830 may delete the stored HD map tiles. For example, the processor 830 may delete the HD map tiles when the vehicle 100 is moving away from a region corresponding to the HD map tiles. For example, the processor 830 may delete the HD map tiles after a preset period of time elapses subsequent to storing the HD map tiles.

FIG. 12A illustrates an example of HD map data that is partitioned into HD map tiles in a scenario when there is no preset destination. In this scenario, the processor 830 may receive a first HD map tile 1251 including the location 1250 of the vehicle 100. A server 21 may receive the location 1250 data of the vehicle 100 from the vehicle 100, and provide the first HD map tile 1251 including the location 1250 of the vehicle 100 to the vehicle 100. Furthermore, the processor 830 may receive HD map tiles 1252, 1253, 1254, 1255 around the first HD map tile 1251. For example, the processor 830 may receive the HD map tiles 1252, 1253, 1254, 1255 adjacent to the top, bottom, left, and right of the first HD map tile 1251, respectively. In this case, the processor 830 may receive a total of five HD map tiles. For example, the processor 830 may further receive a HD map tile located in a diagonal direction, along with the HD map tiles 1252, 1253, 1254, 1255 adjacent to the top, bottom, right, and left of the first HD map tile 1251, respectively. In this case, the processor 830 may receive a total of nine HD map tiles.

FIG. 12B illustrates an example of HD map data that is partitioned into HD map tiles in a scenario when there is a preset destination. As illustrated in FIG. 12B, when there is a preset destination, the processor 830 may receive a tile associated with a path from the location 1250 of the vehicle 100 to the destination. The processor 830 may receive a plurality of tiles to cover the path.

In some implementations, the processor 830 may receive the entire tiles covering the path at once.

Alternatively, in some implementations, the processor 830 may receive different tiles of the path at different times. For example, the processor 830 may divide and receive the tiles of the path while the vehicle 100 is moving along the path. The processor 830 may receive at least part of the entire tiles based on the location of the vehicle 100 while the vehicle 100 is moving along the path. Then, the processor 830 may continuously receive tiles (and may delete the received tiles) while the vehicle 100 is moving.

The processor 830 may generate electronic horizon data based on HD map data.

In some implementations, the vehicle 100 may be driven with the final destination being set (e.g., as in FIG. 12B). The final destination may be set based on a user input received through the user interface device 200 or the communication device 400. Depending on the implementation, the final destination may be set by the driving system 260.

With the final destination being set, the vehicle 100 may be located within a preset distance a first point while driving. When the vehicle 100 is located within a preset distance from the first point, the processor 830 may generate electronic horizon data having the first point as a starting point and the second point as an end point. The first point and the second point may be one point on a path to the final destination. The first point may be described as a point at which the vehicle 100 is located or to be located in the near future. The second point may be described by the horizon mentioned above.

The processor 830 may receive a HD map in a region including a section from the first point to the second point. For example, the processor 830 may request and receive a HD map for a region within a predetermined radius from the section from the first point to the second point.

The processor 830 may generate electronic horizon data for a region including the section from the first point to the second point based on the HD map. The processor 830 may generate horizon map data for a region including the section from the first point to the second point. The processor 830 may generate horizon pass data for a region including the section from the first point to the second point. The processor 830 may generate main pass 313 data for a region including the section from the first point to the second point. The processor 830 may generate sub pass 314 data for a region including the section from the first point to the second point.

When the vehicle 100 is located within a preset distance from the first point, the processor 830 may generate electronic horizon data having the second point as a starting point and a third point as an end point. The second point and the third point may be one point on a path to the final destination. The second point may be described as a point at which the vehicle 100 is located or to be located in the near future. The third point may be described by the horizon mentioned above. On the other hand, electronic horizon data having the second point as the starting point and the third point as the end point may be geographically connected to the foregoing electronic horizon data having the first point as the starting point and the second point as the end point.

The operation of generating electronic horizon data having the second point as the starting point and the third point as the end point may be applied with the foregoing electronic horizon data having the first point as the starting point and the second point as the end point.

According to an implementation, the vehicle 100 may be driven even when the final destination is not set.

FIG. 13 is a flowchart for explaining a path providing method of the path providing device of FIG. 9.

The processor 830 receives a high-definition map from an external server (S1310).

The external server is an example of the telematics communication device 910 as a device capable of communicating through the first telecommunication control unit 812. The high-definition map may include at least one of the four layers described above with reference to FIG. 11B of an ADAS MAP 1060.

The processor 830 may generate forward path information for guiding the vehicle (e.g., along a road located in the front of the vehicle). The forward path information may be generated in units of lanes (e.g., units of lanes of the road in front of the vehicle) using the high-definition map (S1320).

Therefore, by utilizing the high-definition map which is partitioned into smaller tiles, the processor 830 may generate more detailed and precise forward path information that reflects particular lanes of the road.

In some implementations, the processor 830 may generate different forward path information depending on whether or not a destination has been set in the vehicle 100.

For example, when a destination has been set in the vehicle 100, then the processor 830 may generate forward path information for guiding a driving path to the destination in units of lanes (e.g., in units of lanes of a road).

By contrast, as another example, when no destination has been set in the vehicle 100, then the processor 830 may calculate a main path (e.g., a most preferred path, MPP) having a highest possibility on which the vehicle 100 may drive, and may generate the forward path information for guiding the main path (MPP) in units of lanes (e.g., units of lanes of a road). In this case, the forward path information may further include sub path information on sub paths branched from the most preferred path (MPP) for the vehicle 100 to be movable at a higher probability than a predetermined reference.

As such, by providing the forward path information in units of lanes, the forward path information may provide a driving path to the destination for each lane indicated on a road, thereby providing more precise and detailed path information. It may be path information conforming to the standard of ADASIS v3.

In some implementations, the forward path information may be provided by subdividing a path on which the vehicle must drive (or a path that the vehicle can drive) in units of lanes (e.g., lanes of a road). The forward path information may be information for guiding a driving path to a destination in units of lanes. When the forward path information is displayed on a display mounted on the vehicle 100, a guide line for guiding a lane (e.g., a lane of a road) that can be driven on the map may be displayed. Moreover, a graphic object indicating the location of the vehicle 100 may be included in at least one lane on which the vehicle 100 is located among a plurality of lanes included in the map.

Therefore, in some implementations, by utilizing a high-definition map that is partitioned into units of tiles, more detailed and precise forward path information may be generated according to units of lanes of the road.

The processor 830 may provide the forward path information to at least one electrical part provided in the vehicle (S1330). Moreover, the processor 830 may provide the forward path information to various applications installed in the system of the vehicle 100.

The electrical part refers to any device mounted on the vehicle 100 to allow communication, and may include the components 120-700 described above with reference to FIG. 7. For example, an object detecting apparatus 300 such as a radar and a lidar, a navigation system 770, a vehicle operating apparatus 600, and the like may be included in the electrical part.

The electrical part may perform its own function to be carried out based on the forward path information.

The forward path information may include a path in units of lanes and a location of the vehicle 100, and may include dynamic information including at least one object that must be sensed by the electrical part. The electrical part may reassign a resource to sense an object corresponding to the dynamic information, determine whether the dynamic information matches sensing information sensed by itself, or change a setting value for generating sensing information.

Next, the processor 830 may receive external information generated by an external device from the external device located within a predetermined range with respect to the vehicle (S1340).

The predetermined range is a distance at which the second telecommunication control unit 914 can perform communication, and may vary according to the performance of the second telecommunication control unit 914. When the second telecommunication control unit 914 performs V2X communication, a V2X communication range may be defined as the predetermined range.

Moreover, the predetermined range may vary according to an absolute speed of the vehicle 100 and/or a relative speed with respect to the external device.

The processor 830 may determine the predetermined range based on the absolute speed of the vehicle 100 and/or the relative speed with respect to the external device, and allow communication with an external device located within the determined predetermined range.

Specifically, external devices capable of communicating through the second telecommunication control unit 914 may be classified into a first group or a second group based on the absolute speed of the vehicle 100 and/or the relative speed with respect to the external device. External information received from an external device included in the first group is used to generate dynamic information described below, but external information received from an external device included in the second group is not used to generate the dynamic information. Even when external information is received from an external device included in the second group, the processor 830 ignores the external information.

The processor 830 may generate dynamic information of an object that must be sensed by at least one electrical part provided in the vehicle based on the external information (S1350), and may match the dynamic information to the forward path information (S1360).

For an example, the dynamic information may correspond to the fourth layer described above with reference to FIGS. 11A and 11B.

As described above in FIGS. 11A and 11B, the path providing device 800 may receive ADAS MAP and/or LDM data. Specifically, the ADAS MAP may be received from the telematics communication device 910 through the first telecommunication control unit 812 and the LDM data may be received from the V2X communication device 920 through the second telecommunication control unit 814.

The ADAS MAP and the LDM data may be composed of a plurality of layers having the same format. The processor 830 may select at least one layer from the ADAS MAP, select at least one layer from the LDM data, and generate the forward path information composed of the selected layers.

For example, the processor 830 may select the first to third layers of the ADAS MAP, select the fourth layer of the LDM data, and generate one forward path information in which four layers are combined into one. In this case, the processor 830 may transmit a reject message for rejecting the transmission of the fourth layer to the telematics communication device 910. It is because the first telecommunication control unit 812 uses less resources to receive some information excluding the fourth layer than to receive all the information including the fourth layer. Part of the ADAS MAP may be combined with part of the LDM data to use mutually complementary information.

For another example, the processor 830 may select the first to fourth layers of the ADAS MAP, select the fourth layer of the LDM data, and generate one forward path information in which five layers are combined into one. In this case, priority may be given to the fourth layer of the LDM data. When there is discrepancy information that does not match the fourth layer of the LDM data in the fourth layer of the ADAS MAP, the processor 830 may delete the discrepancy information or correct the discrepancy information based on the LDM data.

The dynamic information may be object information for guiding a predetermined object. For example, at least one of a location coordinate for guiding the location of the predetermined object, and information for guiding the shape, size, and type of the predetermined object may be included in the dynamic information.

The predetermined object may denote an object that obstructs driving in the corresponding lane among objects that can drive on a road.

For example, the predetermined object may include a bus stopping at a bus stop, a taxi stopping at a taxi stop, a truck dropping a courier, and the like.

For another example, the predetermined object may include a garbage collection vehicle driving at a constant speed or below, or a large vehicle (e.g., truck or container truck, etc.) determined to obstruct view.

For still another example, the predetermined object may include an object indicating an accident, road damage, or construction.

As described above, the predetermined object may include all types of objects disallowing the driving of the present vehicle 100 or obstructing the lane not to allow the vehicle 100 to drive. Traffic signals such as ice roads, pedestrians, other vehicles, construction signs, and traffic lights to be avoided by the vehicle 100 may correspond to the predetermined object and may be received by the path providing device 800 as the external information.

Meanwhile, the processor 830 may determine whether a predetermined object guided by the external information is located within a reference range based on the driving path of the vehicle 100.

Whether or not the predetermined object is located within the reference range may vary depending on the lane on which the vehicle 100 drives and the location of the predetermined object.

For example, external information for guiding a sign indicating the construction of a third lane ahead 1 km while driving on a first lane may be received. When the reference range is set to 1 m with respect to the vehicle 100, the sign is located out of the reference range. It is because when the vehicle 100 continues to drive on the first lane, the third lane is located out of 1 m with respect to the vehicle 100. On the contrary, when the reference range is set to 10 m with respect to the vehicle 100, the sign is located within the reference range.

The processor 830 generates the dynamic information based on the external information when the predetermined object is located within the reference range, but does not generate the dynamic information when the predetermined object is located out of the reference range. In other words, the dynamic information may be generated only when the predetermined object guided by the external information is located on a driving path of the vehicle 100 or within a reference range capable of affecting the driving path of the vehicle 100.

Since the path providing device according to the present disclosure combines information received through the first telecommunication control unit and information received through the second telecommunication control unit into one information during the generation of forward path information, optimal forward path information in which information provided through different telecommunication control units are mutually complemented. It is because the information received through the first telecommunication control unit has a restriction in that it is unable to reflect the information in real time, but the information received through the second telecommunication control unit complements the real-time property.

Moreover, since when there is information received through the second telecommunication control unit, the processor 830 controls the first telecommunication control unit so as not to receive the corresponding information, it may be possible to use the bandwidth of the first telecommunication control unit less than the related art. In other words, the resource use of the first telecommunication control unit may be minimized.

Figure 14:
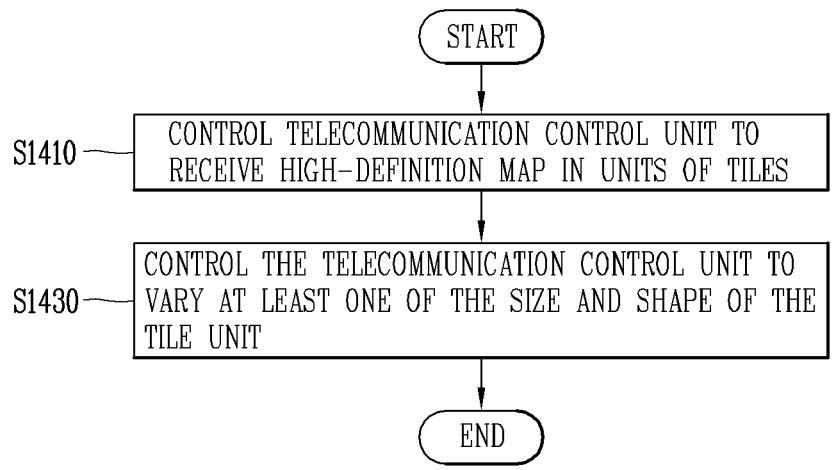
FIG. 14 is a flowchart illustrating an example of a path providing device receiving a high-definition map on a tile-by-tile basis.

FIG. 14 is a flowchart for explaining a method in which a path providing device receives a high-definition map on a tile-by-tile basis.

The processor 830 controls the telecommunication control unit 810 to receive a high-definition map in units of tiles.

As described above in FIGS. 12A and 12B, the high-definition map may include a plurality of tiles having a standardized specification. For an example, a high-definition map may be divided into square tiles each having a length of 2 km and a height of 2 km.

The processor 830 may request one or more tiles to the telematics communication device 910 and/or the V2X communication device 930.

The processor 830 may transmit the identification number of each tile or send an expected driving path of the vehicle 100 to specify the one or more tiles. An external device that has received the expected driving path may specify the one or more tiles according to the expected driving path.

The processor 830 may calculate a path to the destination as an expected driving path when a destination is set in the vehicle 100. Alternatively, when the destination is not set in the vehicle 100, a path having the highest possibility that the vehicle 100 may drive based on the location of the vehicle 100 may be calculated as the expected driving path.

The processor 830 may sequentially receive one or more tiles based on the expected driving path.

For example, when there is no destination, one center tile may be selected based on the location of the vehicle 100, and eight surrounding tiles adjacent to the selected center tile may be selected. A total of nine tiles have different priorities according to the driving direction of the vehicle 100, and are sequentially received at the path providing device 800 according to the priorities.

For another example, when there is a destination, the sequence of the tiles to be received is determined according to the expected driving path of the vehicle 100, and the tiles are sequentially received according to the sequence.

In some implementations, the processor 830 may vary at least one of the size and shape of the tile unit (S1430). For example, in some scenarios, this may be done by controlling the telecommunication control unit 810.

When a fixed size tile is downloaded, unnecessary region may be downloaded to the map, resulting in inefficiency. For example, in case where the entire tile is downloaded even when only a portion of a tile is used, waste of resources occurs. For efficient reception of a high-definition map, the processor 830 may (e.g., by controlling the telecommunication control unit 810) vary the size and shape of the tile unit (e.g., according to a preset condition).

For an example, the processor 830 may control the telecommunication control unit 810 to vary at least one of a size or a shape of the tile unit, based on the expected driving path of the vehicle 100.

The processor 830 may receive a tile of a first size when the expected driving path is a downtown area in which roads are intricately intertwined, and receive a tile of a second size (larger than the first size) when the expected driving path is a suburban area with few roads. Even for a tile of the same size, a tile in a downtown area typically contains more data than a tile in a suburban area and thus typically requires more time and resources to receive.

As another example, the processor 830 may determine the size and/or shape of the tile unit based on the vehicle driving information. The telecommunication control unit 810 receives the vehicle driving information from at least one electrical part provided in the vehicle, and the processor 830 determines at least one of the size and shape of the tile unit based on the vehicle driving information.

For example, the processor 830 may change at least one of the size and shape of the tile unit based on the speed of the vehicle 100 included in the vehicle driving information. As the speed increases, a moving distance of the vehicle 100 per unit time increases, and thus the vehicle 100 must quickly receive necessary tiles prior to moving. The processor 830 may receive a tile of a first size when the speed of the vehicle 100 is within a first range, and may receive a tile of a second size (smaller than the first size) when the speed of the vehicle 100 falls within a second range faster than the first range.

As another example, the processor 830 measures a quality of service (QoS) of the telecommunication control unit 810, and controls the telecommunication control unit 810 to vary at least one of the size and shape of the tile unit based on the quality of communication service.

The quality of communication service may be calculated by a bandwidth, a data transmission rate, an error rate of a transmission signal, a connection quality, a connection delay time, and the like used by the telecommunication control unit 810.

For example, the path providing device 800 may receive a tile of a first size when the data transmission rate falls within a first range, and the path providing device 800 may receive a tile of a second size smaller than the first size when the data transmission rate falls within a second range slower than the first range.

As yet another example, the processor 830 may control the telecommunication control unit 810 to vary at least one of the size and shape of the tile unit based on a user input.

As the size of the tile decreases, the map of an unnecessary portion is not received, and resource saving is carried out as much as the portion not received. It is because the high-definition map is received through the telecommunication control unit, and cost equivalent to the amount of received data is incurred. However, as the size of the tile decreases, a use rate of the processor increases, and thus the execution of other functions may be limited or the execution speed of the function may be slowed down.

In consideration of these advantages and disadvantages, the user may select at least one of the size and shape of the tile unit desired for himself or herself through a user input. A display device mounted on the vehicle 100 may provide a user interface capable of selecting at least one of the size and shape of the tile unit. The processor 830 may control the telecommunication control unit 810 to vary at least one of the size and shape of the tile unit based on a user input entered through the display device.

The processor 830 may determine at least one of the size and shape of the tile unit according to a preset condition to transmit a notification message informing the determined tile unit to an external device through the telecommunication control unit 810. In response to the notification message, the external device may provide a tile having a size and a shape requested by the path providing device 800 to the path providing device 800.

As described above, the path providing device 800 according to the present disclosure may variably control the size and/or shape of tiles to be downloaded during the generation of forward path information according to the driving environment of the vehicle 100 and the location of the vehicle 100.

Figure 15:
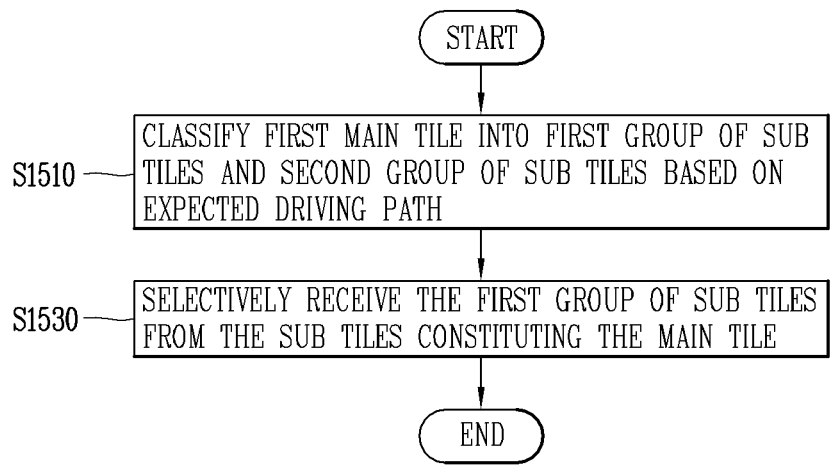
FIG. 15 is a flowchart illustrating an example of a method of dividing a standard main tile into sub tiles and receiving the divided sub tiles.
Figure 16A:
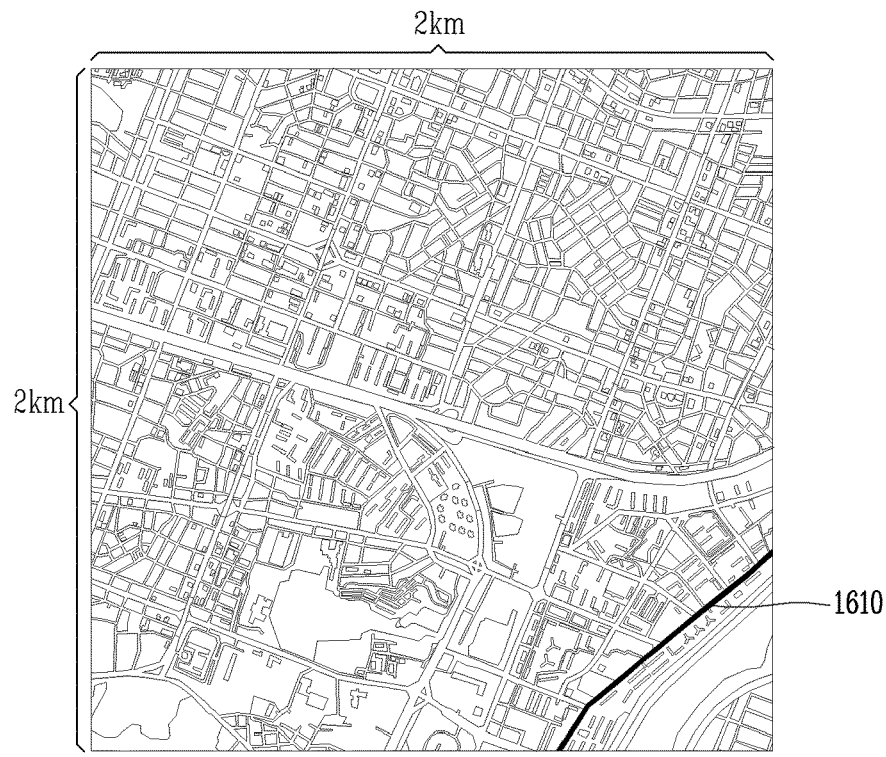
FIGS. 16A, 16B, and 16C are diagrams illustrating examples of dividing a standard main tile into sub tiles (e.g., according to FIG. 15)
Figure 16B:
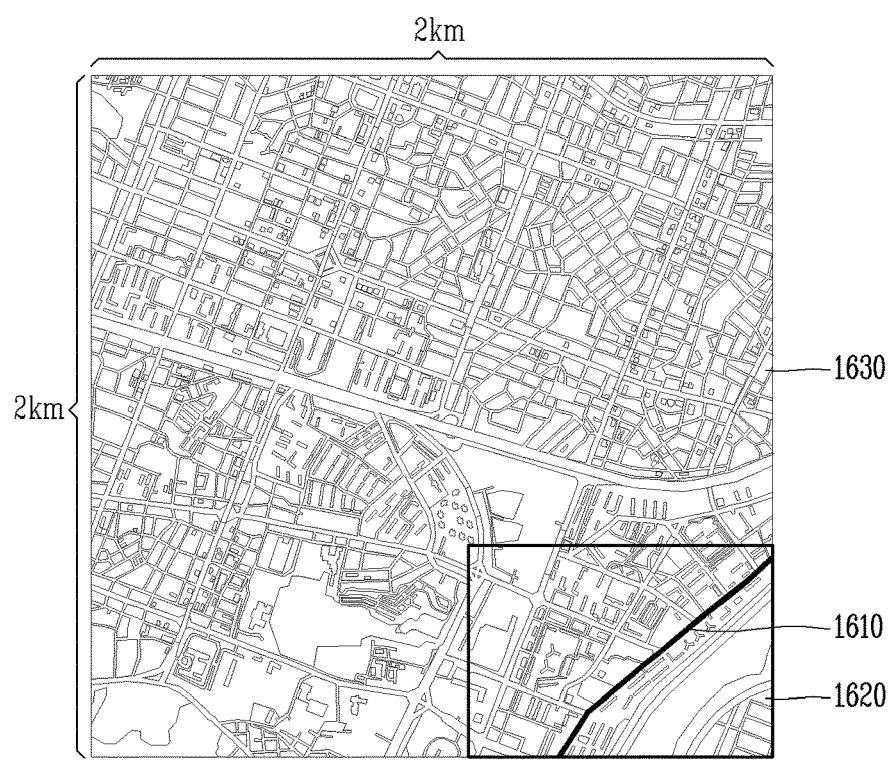
Figure 16C:
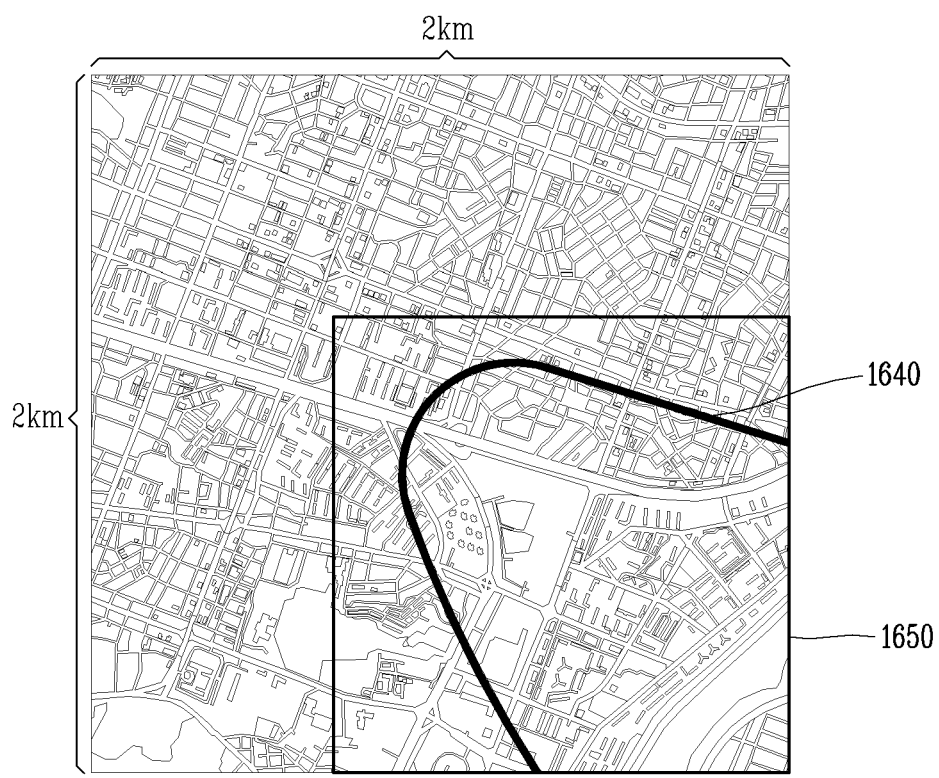

FIG. 15 is a flowchart for explaining a method of dividing a standard main tile into sub tiles and receiving the divided sub tiles, and FIGS. 16A, 16B and 16C are exemplary views for explaining the method of FIG. 15.

When the path providing device 800 receives a first main tile among a plurality of main tiles constituting the high-definition map, the first main tile is classified into a first group of sub tiles and a second group of sub tiles (1510).

The processor 830 may calculate a use rate of the first main tile based on the expected driving path of the vehicle 100. For example, the use rate may be calculated by dividing an area of a required portion according to the expected driving path by a total area of the first main tile.

The processor 830 receives the entire first main tile when the use rate is higher than a reference but receives a portion of the first main tile when the use rate is lower than the reference.

In order to receive a portion of the first main tile, the processor 830 classifies the first main tile into a first group of sub tiles and a second group of sub tiles according to the expected driving path.

It may also be possible to extract only the first group of sub tiles from the first main tile without classifying the first main tile into the first group and the second group.

FIG. 16A illustrates an example of a first main tile 1600 that must be received by the path providing device 800. FIG. 16B illustrates a first expected driving path 1610 of the vehicle 100, and FIG. 16C illustrates a second expected driving path 1640 of the vehicle 100.

The processor 830 may extract a first sub tile 1620 including the first expected driving path 1610 from the first main tile 1600 based on the first expected driving path 1610.

In this case, the first main tile 1600 is classified into the first sub tile 1620 and a second sub tile 1630 corresponding to the remaining portion thereof. Since the processor 830 does not need to receive the second sub tile 1630, it may result in an effect of cost and resource savings.

The processor 830 may extract a third sub tile 1650 including the second expected driving path 1640 from the first main tile 1600 based on the second expected driving path 1640.

As described above, sub tiles of different sizes and/or different shapes may be received through the telecommunication control unit 810 according to the expected driving path of the vehicle 100. In some implementations, various shapes of sub tiles other than a rectangle may be received through the telecommunication control unit 810 according to the expected driving path. For example, at least one of the size and shape of the sub tiles constituting the first main tile may be varied according to a road included in the first main tile.

The processor 830 selectively receives a first group of sub tiles among the sub tiles constituting the first main tile (S1530). In other words, the first group of sub tiles are received but the second group of sub tiles are not received.

Figure 17:
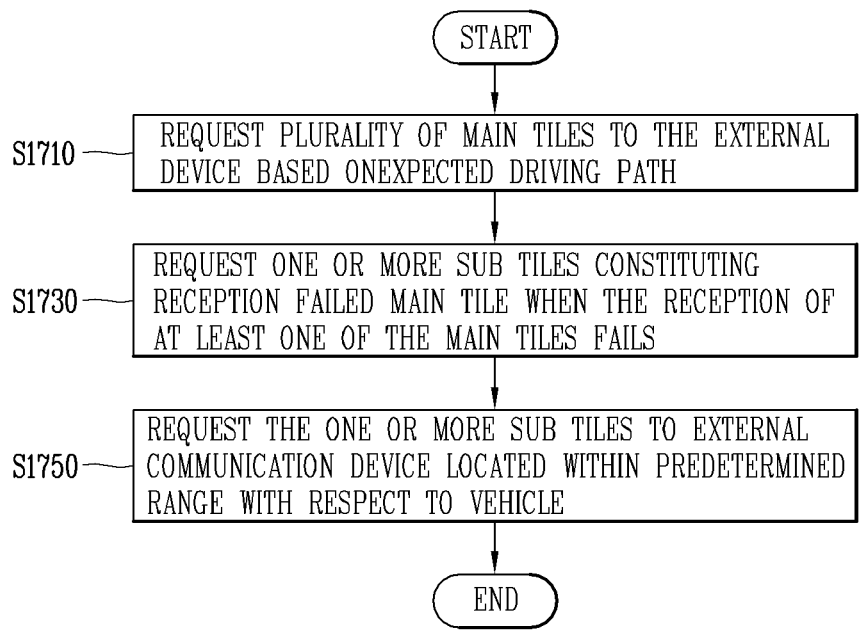
FIG. 17 is a flowchart illustrating an example of an operation in case where the reception of a standard main tile fails.

FIG. 17 is a flowchart for explaining an operation in case where the reception of a standard main tile fails.

The processor 830 requests a plurality of main tiles from the external device based on the expected driving path (S1710).

The plurality of main tiles are sequentially received according to the expected driving path.

When the reception of at least one main tile among the main tiles fails, the processor 830 may request one or more sub tiles constituting the reception failed main tile to the external device (S1730).

For example, a third main tile may be received, although a second main tile must be received subsequent to the first main tile. In this case, the processor 830 may determine that the reception of the second main tile has failed.

For another example, the first main tile may be received, but the first main tile may not be available for use or a portion of the first main tile may be missing. In this case, the processor 830 may determine that the reception of the first main tile has failed.

When reception fails, the processor 830 may change at least one of the size and shape of the tile unit receiving the high-definition map. For example, when reception fails while receiving a main tile, the telecommunication control unit 810 may be controlled to receive sub tiles having a size smaller than the main tile.

The one or more sub tiles may be requested to an external communication device located within a predetermined range with respect to the vehicle (S1750).

As described above in FIG. 9, the path providing device 800 includes a first telecommunication control unit 812 for communicating with the telematics communication device 910 and a second telecommunication control unit 814 for communicating with the V2X communication device 930.

The first telecommunication control unit 812 receives the high-definition map from an external server, and the second telecommunication control unit 814 may receive external information from an external communication device located within a predetermined range with respect to the vehicle 100.

When the reception of at least one of the main tiles fails, the processor 830 may request the sub tiles to the external server through the first telecommunication control unit 812, and request to the external communication device through the second telecommunication control unit 814.

When the reception of a main tile fails, it may be possible to reduce failure probability by attempting reception with a sub tile having a size smaller than the main tile. Moreover, it is highly likely that a nearby vehicle may drive on the same expected driving path, and thus the path providing device 800 may have already downloaded the necessary main tile. It may be possible to increase the probability of securing the necessary tile by requesting tiles that have failed to receive to not only the server but also the nearby vehicle.

Figure 18:
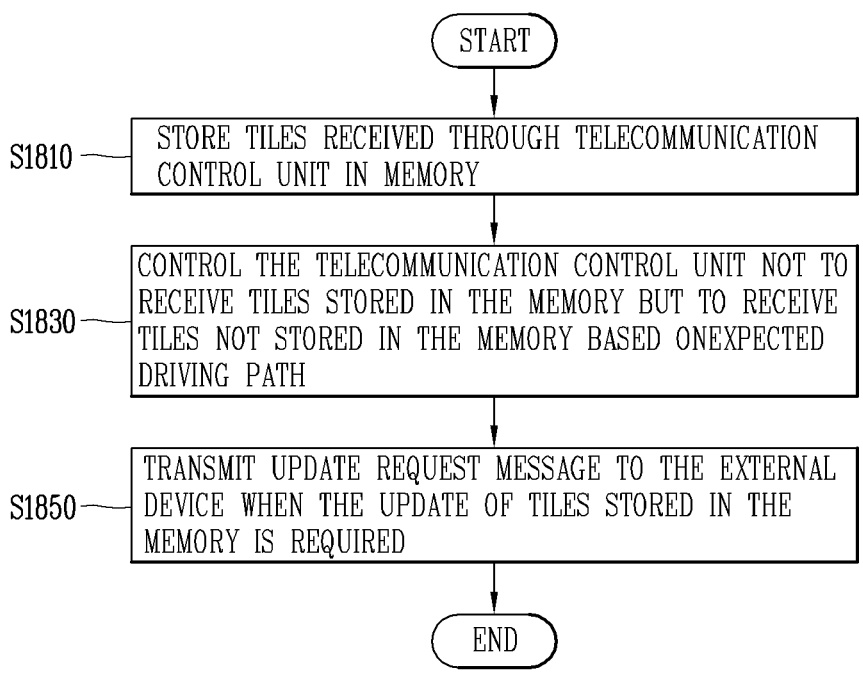
FIG. 18 is a flowchart illustrating an example of receiving a high-definition map using a tile stored in a memory.

FIG. 18 is a flowchart illustrating a method of receiving a high-definition map using a tile stored in a memory.

The processor 830 may store tiles received through the telecommunication control unit 810 in a memory (S1810).

The processor 830 may delete tiles stored in the memory after a predetermined period of time has elapsed based on the received time point. Alternatively, when the vehicle 100 is turned off, all of the tiles stored in the memory may be deleted.

The processor 830 may control the telecommunication control unit 810 not to receive tiles stored in the memory but to receive tiles not stored in the memory based on the expected driving path (S1830).

When the vehicle 100 moves from a first point to a second point and then returns to the first point, necessary tiles may already have been stored in the memory. In order to prevent unnecessary re-downloading, the processor 830 may search the memory for necessary tiles based on the expected driving path, and control the telecommunication control unit 810 not to receive the searched tiles when there are the searched tiles.

Meanwhile, when updating of tiles stored in the memory is required, the processor 830 may transmit an update request message to the external device through the telecommunication control unit 810 (S1850).

For example, when the creation date of a first tile stored in the memory is later than that of the first tile stored in the external server, an update to the first tile is required. In this case, the processor 830 may transmit an update request message for the first tile.

The sub tiles constituting a main tile requiring updating may be classified into a first group requiring updating and a second group requiring no updating. The processor 830 may extract sub tiles requiring updating from the main tile based on the expected driving path. The extracted sub tiles are classified into the first group, and the non-extracted sub tiles are classified into the second group.

The processor 830 may receive the subtitles included in the first group and perform the update. The entire main tile requiring updating is not received but a part thereof is received and updated, and thus there is an effect of saving the resources of the path providing device 800.

Figure 19:
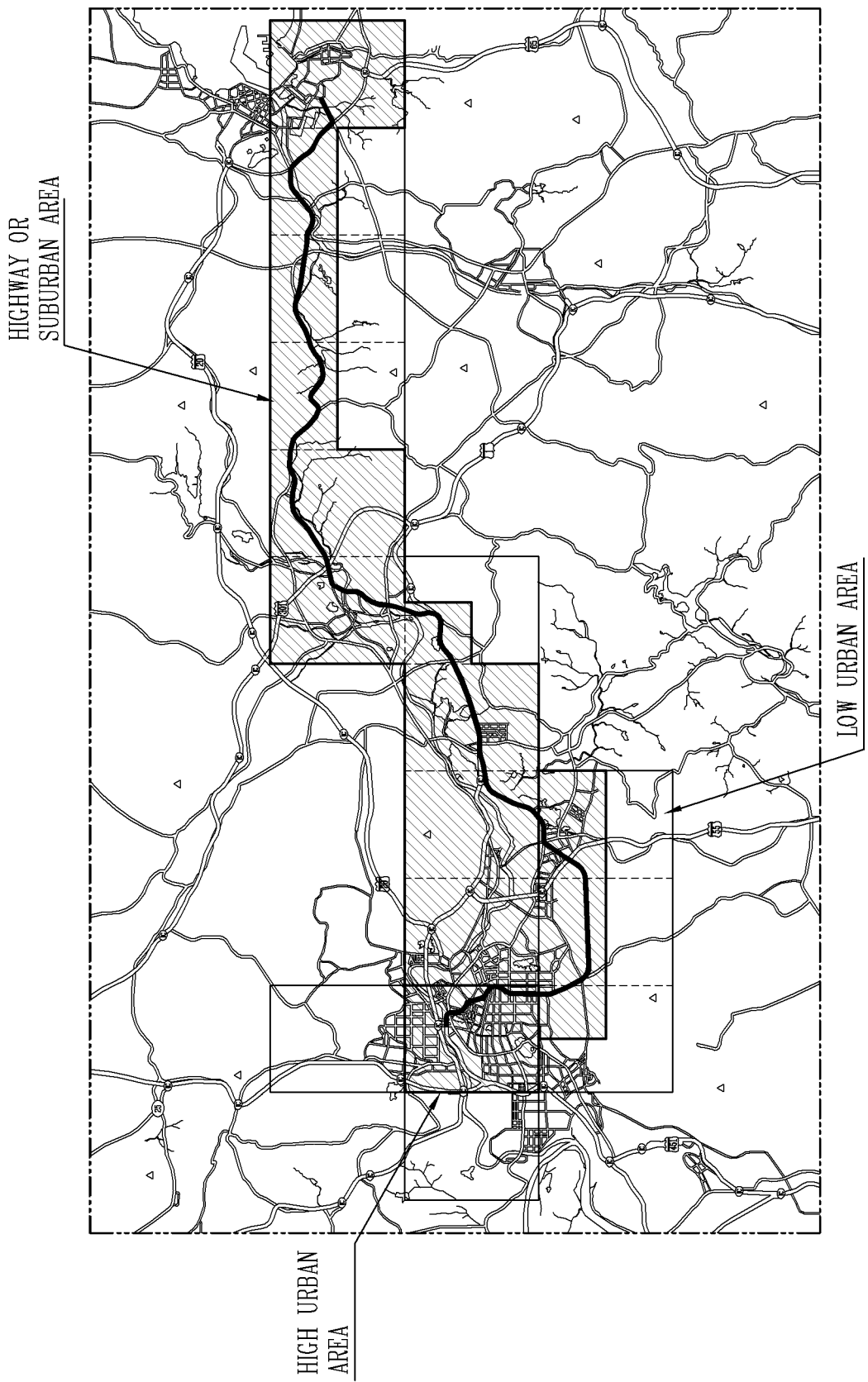
FIG. 19 is a diagram illustrating an example of receiving tiles with different sizes according to an expected driving path of a vehicle.

FIG. 19 is an exemplary diagram showing an implementation of receiving tiles with different sizes according to an expected travel path of a vehicle.

Referring to FIG. 19, a portion 1900 of a high-definition map is disclosed, and an expected driving path 1910 of the vehicle 100 is illustrated on the portion 1900 of the high-definition map.

The high-definition map is composed of a plurality of main tiles having the same size and shape, and main tiles to be received by the path providing device 800 are distinguished from main tiles not to be received according to the expected driving path 1910.

For example, in a high urban area with a high data density, sub tiles corresponding to 500 m each in length and width may be received. In a low urban area with a normal data density, sub tiles corresponding to 1 km each in length and width may be received. In a highway section or in a suburban area with a low data density, a main tile may be received rather than a sub tile.

The main tiles to be received by the path providing device 800 are divided into a first group of sub tiles to be received by the path providing device 800 and a second group of sub tiles that are not received according to a preset condition. As the size and shape of the received tiles are varied, there is an effect of reducing the resource of the path providing device 800.

The foregoing present disclosure may be implemented as codes (an application or software) readable by a computer on a medium written by the program. The control method of the above-described autonomous vehicle may be implemented by codes stored in a memory or the like.

The computer-readable media may include all kinds of recording devices in which data readable by a computer system is stored. Examples of the computer-readable media may include ROM, RAM, CD-ROM, magnetic tape, floppy disk, and optical data storage device, and the like, and also include a device implemented in the form of a carrier wave (for example, transmission via the Internet). In addition, the computer may include a processor or controller. Accordingly, the detailed description thereof should not be construed as restrictive in all aspects but considered as illustrative. The scope of the disclosure should be determined by reasonable interpretation of the appended claims and all changes that come within the equivalent scope of the disclosure are included in the scope of the disclosure.

What is claimed is:

1. A path providing device configured to provide a path to a vehicle, the path providing device comprising:
    a telecommunication control unit;
    at least one processor; and
    at least one computer memory operably connectable to the at least one processor and storing instructions that, when executed by the at least one processor, perform operations comprising:
    receiving, through the telecommunication control unit, high-definition map data from an external device, wherein the high-definition map data is received as a plurality of tile units;
    varying at least one of a size or a shape of at least one tile unit of the high-definition map data;
    generating, based on the high-definition map data comprising the plurality of tile units, forward path information for guiding a path on a road ahead of the vehicle, wherein the forward path information is generated in units of lanes of the road ahead of the vehicle; and
    providing the forward path information to at least one electrical part provided in the vehicle,
    wherein the plurality of tile units comprises a first main tile unit that includes a plurality of sub-tile units, the plurality of sub-tile units comprising (i) a first group of sub-tile units that include an expected driving path of the vehicle and (ii) a second group of sub-tile units that are arranged outside the first group of sub-tile units, and
    wherein the operations further comprise receiving, through the telecommunication control unit, at least one of the first group of sub-tile units without receiving the second group of sub-tile units.

2. The path providing device of claim 1, wherein varying the at least one of the size or the shape of the at least one tile unit of the high-definition map data is performed based on the expected driving path of the vehicle.

3. The path providing device of claim 2, wherein generating the forward path information comprises:
    based on a destination being set for the vehicle, determining the expected driving path of the vehicle as a first path to the destination; and
    based on the destination not being set for the vehicle, determining the expected driving path of the vehicle as a second path which has a highest possibility along which the vehicle is driven, based on a location of the vehicle.

4. The path providing device of claim 2, wherein the operations further comprise:
    requesting, to the external device, a plurality of main tile units based on the expected driving path; and
    based on failure of reception of at least one main tile unit of the plurality of main tile units, requesting, to the external device, sub-tile units constituting the at least one main tile unit for which reception failed.

5. The path providing device of claim 4, wherein the telecommunication control unit comprises a first telecommunication control unit and a second telecommunication control unit, and
    wherein the operations further comprise:
    receiving, through the first telecommunication control unit, the high-definition map data from an external server;
    receiving, through the second telecommunication control unit, external information from an external communication device that is located within a predetermined range with respect to the vehicle; and
    based on the failure of reception of the at least one main tile unit, requesting the sub-tile units of the at least one main tile unit to the external server through the first telecommunication control unit.

6. The path providing device of claim 2, wherein the at least one computer memory is further configured to store first tile units of the high-definition map data received through the telecommunication control unit, and
    wherein the operations further comprise:
    controlling the telecommunication control unit to not receive the first tile units that have been stored in the at least one computer memory, but to receive second tile units that are not stored in the at least one computer memory, based on the expected driving path.

7. The path providing device of claim 6, wherein the operations further comprise:
    transmitting an update request message to the external device through the telecommunication control unit based on an updating to be performed on at least one of the first tile units that are stored in the at least one computer memory;
    classifying the plurality of sub-tile units constituting the at least one of the first tile units for which updating is to be performed, into (i) the first group of sub-tile units requiring updating, and (ii) the second group of sub-tiles requiring no updating; and
    receiving at least one of the first group of sub-tile units to perform the updating of the at least one of the first tile units that are stored in the at least one computer memory.

8. The path providing device of claim 1, wherein the operations further comprise:

varying at least one of a size or a shape of at least one sub-tile unit among the plurality of sub-tile units constituting the first main tile unit, according to a road that is included in the first main tile unit.

9. The path providing device of claim 1, wherein the operations further comprise:
measuring a quality of communication service of the telecommunication control unit; and
varying the at least one of the size or the shape of the at least one tile unit based on the quality of communication service.

10. The path providing device of claim 1, wherein the operations further comprise:
receiving, through the telecommunication control unit, vehicle driving information from at least one electrical part provided in the vehicle; and
determining at least one of the size or the shape of the at least one tile unit based on the vehicle driving information.

11. The path providing device of claim 10, wherein varying the at least one of the size or the shape of the at least one tile unit is performed based on speed information of the vehicle that is included in the vehicle driving information.

12. The path providing device of claim 1, wherein varying the at least one of the size or the shape of the at least one tile unit is performed based on a user input.

13. The path providing device of claim 1, wherein the operations further comprise:
transmitting, through the telecommunication control unit, a notification message that informs the external device of the at least one of the size or the shape of the at least one tile unit.

14. A method of controlling a path providing device for providing a path to a vehicle, the method comprising:
receiving, through a telecommunication control unit, high-definition map data from an external device, wherein the high-definition map data is received as a plurality of tile units;
varying at least one of a size or a shape of at least one tile unit of the high-definition map data;
generating, based on the high-definition map data comprising the plurality of tile units, forward path information for guiding a path on a road ahead of the vehicle, wherein the forward path information is generated in units of lanes of the road ahead of the vehicle; and
providing the forward path information to at least one electrical part provided in the vehicle,
wherein the plurality of tile units comprises a first main tile unit that includes a plurality of sub-tile units, the plurality of sub-tile units comprising (i) a first group of sub-tile units that include an expected driving path of the vehicle and (ii) a second group of sub-tile units that are arranged outside the first group of sub-tile units, and
wherein the method further comprises receiving, through the telecommunication control unit, at least one of the first group of sub-tile units without receiving the second group of sub-tile units.

15. The method of claim 14, wherein varying the at least one of the size or the shape of the at least one tile unit of the high-definition map data is performed based on an expected driving path of the vehicle, and
wherein generating the forward path information comprises:
based on a destination being set for the vehicle, determining the expected driving path of the vehicle as a first path to the destination; and
based on the destination not being set for the vehicle, determining the expected driving path of the vehicle as a second path which has a highest possibility along which the vehicle is driven, based on a location of the vehicle.

16. The method of claim 15, further comprising:
requesting, to the external device, a plurality of main tile units based on the expected driving path; and
based on failure of reception of at least one main tile unit of the plurality of main tile units, requesting, to the external device, sub-tile units constituting the at least one main tile unit for which reception failed.

17. The method of claim 14, further comprising:
receiving, through the telecommunication control unit, vehicle driving information from at least one electrical part provided in the vehicle; and
determining at least one of the size or the shape of the at least one tile unit based on the vehicle driving information.

18. The method of claim 14, further comprising:
transmitting, through the telecommunication control unit, a notification message that informs the external device of the at least one of the size or the shape of the at least one tile unit.

* * * * *